US008789471B2

(12) United States Patent
Hanano et al.

(10) Patent No.: US 8,789,471 B2
(45) Date of Patent: Jul. 29, 2014

(54) SEAL TAPE FOR GAS GENERATOR

(75) Inventors: Teppei Hanano, Hyogo (JP); Shinichiro Ukita, Hyogo (JP)

(73) Assignee: Daicel Corporation, Osaka-shi (JP)

( * ) Notice: Subject to any disclaimer, the term of this patent is extended or adjusted under 35 U.S.C. 154(b) by 245 days.

(21) Appl. No.: 13/398,539

(22) Filed: Feb. 16, 2012

(65) Prior Publication Data
US 2012/0210905 A1   Aug. 23, 2012

Related U.S. Application Data

(60) Provisional application No. 61/444,462, filed on Feb. 18, 2011.

(30) Foreign Application Priority Data

Feb. 17, 2011  (JP) .................................. 2011-31706

(51) Int. Cl.
C06D 5/00        (2006.01)
(52) U.S. Cl.
USPC ......................................... 102/530; 280/741
(58) Field of Classification Search
USPC ........ 102/530, 531; 220/202, 203.01, 203.08; 280/736, 741
See application file for complete search history.

(56) References Cited

U.S. PATENT DOCUMENTS

| | | | |
|---|---|---|---|
| 5,471,932 A * | 12/1995 | Kraft et al. ..................... | 102/531 |
| 5,951,041 A * | 9/1999 | Iwai et al. ..................... | 280/737 |
| 6,032,979 A | 3/2000 | Mossi et al. | |
| 6,626,115 B2 * | 9/2003 | Lutz et al. ..................... | 102/530 |
| 2001/0013300 A1 | 8/2001 | Lutz et al. | |
| 2003/0150437 A1 | 8/2003 | Nakamizo et al. | |
| 2008/0284146 A1 | 11/2008 | Hirooka et al. | |
| 2012/0091384 A1 | 4/2012 | Hoppe | |

FOREIGN PATENT DOCUMENTS

| | | |
|---|---|---|
| DE | 198 17 485 A1 | 10/1999 |
| DE | 200 02 377 U1 | 8/2000 |
| DE | 10 2009 031 710 A1 | 1/2011 |
| EP | 0 841 225 A1 | 5/1998 |
| JP | 2005-178643 A | 7/2005 |
| WO | 00/32447 A1 | 6/2000 |

OTHER PUBLICATIONS

International Search Report and Written Opinion issued in International Application No. PCT/JP2012/053591 on May 14, 2012.

* cited by examiner

*Primary Examiner* — Gabriel Klein
(74) *Attorney, Agent, or Firm* — Birch, Stewart, Kolasch & Birch, LLP

(57) ABSTRACT

A seal tape, a gas generator for a restraining apparatus using the seal tape, and a method for manufacturing a gas generator are provided. The seal tape closes, from an outside of the gas generator housing, a gas discharge port in a housing. The seal tape includes, a rupture portion for forming a door portion, and including a fragile portion and a rupture blocking portion at a tip of the fragile portion, a fixing support portion remaining attached to the housing, and the door portion bounded by the rupture portion and the fixing support portion being adjusted such that the gas discharge port is entirely open in a case where the door portion is opened.

18 Claims, 9 Drawing Sheets

(a)　　　　　　　(b)

(a)  (b)

(a)  (b)

US 8,789,471 B2

SEAL TAPE FOR GAS GENERATOR

This nonprovisional application claims priority under 35 U.S.C. §119(a) to Patent Application No. 2011-31706 filed in Japan on 17 Feb. 2011, and 35 U.S.C. §119(e) to U.S. Provisional Application No. 61/444,462 filed on 18 Feb. 2011, both of which are incorporated by reference.

BACKGROUND OF THE INVENTION

The present invention relates to a seal tape for use in a gas generator for a restraining apparatus such as an airbag system installed in a vehicle or the like, a gas generator for a restraining apparatus that uses the seal tape, and a method for manufacturing a gas generator for a restraining apparatus that uses the seal tape.

DESCRIPTION OF THE RELATED ART

An airbag system is known as a restraining apparatus installed on a vehicle such as an automobile.

In a gas generator used in the airbag system, a gas generating agent is accommodated in a housing having a gas discharge port and serving as an outer shell container, and the gas discharge port is closed by a seal tape attached from the inside for the purpose of moisture-proofing.

JP-A No. 2005-178643 discloses an invention relating to a gas generator for an airbag in which gas generating agents 41, 42 are loaded into a cylindrical housing 10. A gas discharge port 13 is formed close to the center, in the longitudinal direction, of the cylindrical housing. The gas generator structure clearly indicates, although it is not shown in the drawings, that the gas discharge port 13 is closed by a seal member from the inside for the purpose of moisture-proofing.

DE-A No. 198 17 485 discloses an invention relating to an inflator in which, as shown in FIG. 1, a gas generating agent 15 is loaded in a housing 3 which is lower in height (shorter in length) than a cylindrical housing 10 described in JP-A No. 2005-178643. A gas discharge port 21 formed in the housing 3 is closed by a sealing 17 from the inside.

In U.S. Pat. No. 6,032,979, the interior of a housing 12 is partitioned into two chambers, gas generating agents 36, 86 are loaded into respective chambers, and a gas discharge port 24 provided in a side wall 22 of the housing 12 is closed by an adhesive foil seal 46 from the inside.

SUMMARY OF INVENTION

The present invention 1 provides a seal tape 10A (referred to hereinbelow as the "first seal tape") for closing, from the outside, a plurality of gas discharge ports 113 formed in a housing of a gas generator for a restraining apparatus, the seal tape 10A including:

a plurality of rupture portions 12 for forming a plurality of door portions 16 that open the gas discharge ports 113 by opening when a pressure is applied in a thickness direction of the seal tape;

a fixing support portion 15 for forming, together with the plurality of rupture portions 12, the plurality of door portions 16, the fixing support portion remaining attached to the housing when a pressure is applied in the thickness direction;

the plurality of rupture portions 12 being formed by a combination of a plurality of linear fragile portions 13 extending linearly from one side to the other side in a width direction of the seal tape with a distance in a longitudinal direction of the seal tape, and rupture blocking portions 14 for blocking propagation of rupture at a tip of each of the plurality of linear fragile portions 13;

the fixing support portion 15 being a band-like portion that is continuous in the longitudinal direction and has a predetermined width (L1) from a side, in the width direction, where the rupture blocking portions 14 are formed;

the plurality of door portions 16 corresponding to a region bounded by the rupture portions 12 and the fixing support portion 15; and an arrangement of the plurality of door portions 16 being adjusted such that when the plurality of gas discharge ports 113 are closed from the outside by the seal tape 10A, the gas discharge ports 113 are entirely open in a case where the door portions 16 are opened.

The present invention 4 provides a seal tape 100 (referred to hereinbelow as the "second seal tape") for closing, from the outside, a plurality of gas discharge ports 113 formed in a housing of a gas generator for a restraining apparatus, the seal tape 100 including:

a plurality of rupture portions 12 for forming a plurality of door portions 16a to 16c that open the gas discharge ports 113 by opening when a pressure is applied in a thickness direction of the seal tape;

a fixing support portion for forming, together with the plurality of rupture portions 12, the plurality of door portions 16, the fixing support portion remaining attached to the housing when a pressure is applied in the thickness direction;

the plurality of rupture portions 12 being formed by a combination of linear fragile portions 13 that are twice the number of the gas discharge ports and extended linearly from one side to the other side in a width direction of the seal tape, with a distance in a longitudinal direction of the seal tape, and rupture blocking portions 14 for blocking propagation of rupture at a tip of each of the plurality of linear fragile portions 13;

the fixing support portion including a first fixing support portion 15 that is a band-like portion formed continuously in the longitudinal direction at a side, in the width direction, where the rupture blocking portions 14 are formed, and a second fixing support portion(s) 19a to 19d corresponding to regions that are sandwiched in the longitudinal direction by two rupture portions 12 and do not face the gas discharge ports 113 when the plurality of gas discharge ports 113 are closed from the outside;

the plurality of door portions 16a to 16c corresponding to regions bounded by the rupture portions 12 and the first fixing support portion 15 and excluding the second fixing support portions 19a to 19d; and the plurality of door portions 16a to 16c and the second fixing support portions 19a to 19d being disposed alternately in the longitudinal direction and adjusted such that when the plurality of gas discharge ports 113 are closed from the outside by the seal tape 10C, the gas discharge ports 113 are entirely open in a case where the door portions 16a to 16c are opened.

The present invention 5 provides a seal tape 50B (referred to hereinbelow as the "third seal tape") for closing, from the outside, a plurality of gas discharge ports 113 formed in a housing of a gas generator for a restraining apparatus, the seal tape 50B including:

a plurality of rupture portions 62 for forming door portions that open the gas discharge ports 113 by opening when a pressure is applied in a thickness direction of the seal tape;

a fixing support portion 68 for forming, together with the plurality of rupture portions 62, a plurality of door portions, the fixing support portion remaining attached to the housing when a pressure is applied in the thickness direction;

the rupture portion 62 including a combination of a region that is to be the door portion in which linear fragile portions 63, 64, 65 are combined so as to form n−1 sides of a polygon (the total number of sides is n), and rupture blocking portions 66, 67 for blocking propagation of rupture at two tips of the linear fragile portions 63, 64, 65;

the gas discharge port 113 being sized to be enclosed in the rupture portion 62 when the rupture portion 62 is a perfect polygon;

the fixing support portion 68 being an outer region (which does not include the rupture blocking portions 66, 67) when the rupture portion 62 is a perfect polygon;

the door portion corresponding to an inner region when the rupture portion 62 is a perfect polygon; and an arrangement of the plurality of door portions being adjusted such that when the plurality of gas discharge ports 113 are closed from the outside by the seal tape 50B, the gas discharge ports 113 are entirely open in a case where the door portions are opened.

The present invention 6 provides a seal tape (50C) (referred to hereinbelow as the "fourth seal tape") for closing, from the outside, a plurality of gas discharge ports 113 formed in a housing of a gas generator for a restraining apparatus, the seal tape 50C including:

a plurality of rupture portions 72 for forming door portions that open the gas discharge ports 113 by opening when a pressure is applied in a thickness direction of the seal tape; and a fixing support portion 77 for forming, together with the plurality of rupture portions 72, a plurality of door portions, the fixing support portion remaining attached to the housing when a pressure is applied in the thickness direction;

each of the plurality of rupture portions 72 including a combination of a region that is to be the door portion in which a linear fragile portion 73 is combined so as to form a partial circle (inclusive of a semicircle) or a partial ellipse (inclusive of a semi-ellipse), and rupture blocking portions 74, 75 for blocking propagation of rupture at two tips of the linear fragile portion 73;

the gas discharge port 113 being sized to be enclosed inside the partial circle or the partial ellipse;

the fixing support portion 77 being an outer region (which does not include the rupture blocking portions 74, 75) when the rupture portion 72 is the partial circle or the partial ellipse;

the door portion corresponding to an inner region of the partial circle or the partial ellipse when the rupture portion 72 is the partial circle or the partial ellipse; and an arrangement of the plurality of door portions being adjusted such that when the plurality of gas discharge ports 113 are closed from the outside by the seal tape 50C, the gas discharge ports 113 are entirely open in a case where the door portions are opened.

The present invention 10 provides a gas generator for a restraining apparatus that accommodates a gas generating agent in a housing having a plurality of gas discharge ports, including:

the gas discharge ports closed from the outside by the seal tape according to any one of invention 1, 4, 5 and 6, so that door portions of the seal tape face the gas discharge ports.

The present invention 14 provides a method for manufacturing a gas generator for a restraining apparatus in which a gas generating agent is accommodated in a housing having a plurality of gas discharge ports, including a step of closing the plurality of gas discharge ports from the outside with the seal tape according to any one of invention 1, 4, 5 and 6, so that door portions of the seal tape face the gas discharge ports.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
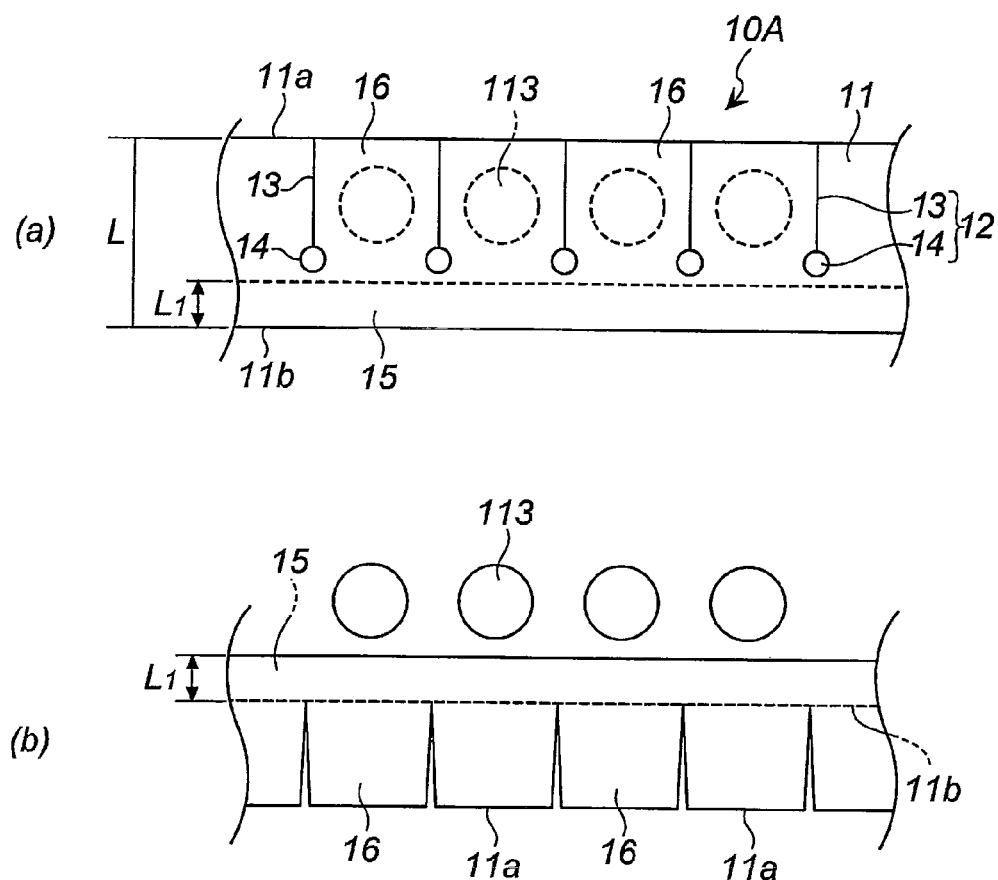
FIG. 1 shows, in (*a*) and (*b*), plan views illustrating an embodiment (first seal tape) of the seal tape of the present invention.

In the process of manufacturing a gas generator, an assembly method is used such that in an initial manufacturing step a gas discharge port is closed by attaching a seal tape from the inside of the housing, and then the necessary components are installed.

With such an assembly method, it is important to prevent the seal tape from being damaged by contact between the seal tape and the components installed at the later stage.

Many gas generators for side airbags and gas generators for passenger seats use a cylindrical housing due to specific installation space thereof (see FIG. 1 of JP-A No. 2005-178643), and the smaller is the inner diameter as compared with the length, the more difficult it is to perform the assembly method in which the seal tape is attached from the inside of the housing.

In particular, in the case of a gas generator having a cylindrical housing in which the gas discharge port is located in the central zone in the longitudinal direction of the housing or at a position close thereto (see FIG. 1 of JP-A No. 2005-178643), the assembly step including the attachment of the seal tape is more difficult to implement and the attachment state of the seal tape is also difficult to verify.

An assembly method in which the seal tape is attached from the outside of the housing can be considered as a method that resolves the aforementioned problem.

However, when a gas discharge port is closed from the outside of the housing by using the conventional seal tape, seal tape fragments that are ruptured and scattered when the gas generator is actuated can flow into and damage the airbag.

The present invention provides a seal tape for a gas generator that does not produce scattered fragments even when ruptured by the applied pressure in the case where the seal tape is attached from the outside of the housing to close the gas discharge port.

Further, the present invention provides a gas generator using the seal tape and a method for manufacturing a gas generator using the seal tape.

The first seal tape in accordance with the present invention closes, from the outside, a plurality of gas discharge ports formed in a housing that is an outer shell container of a gas generator for use in a restraining apparatus (airbag apparatus and the like).

The first seal tape in accordance with the present invention has rupture portions and a fixing support portion, and a plurality of door portions (equal in number to the gas discharge ports) are formed by the rupture portions and the fixing support portion. The door portion works as a lid or a cover to seal the port and rupture in the rupture portion to form an open door. The door portion is a lid portion or a cover portion.

Each of the plurality of door portions formed on the first seal tape is provided such that each of the gas discharge ports is surrounded by the fragile portion and a hinge portion, and disposed such that gas discharge port is entirely closed by the door portion. The hinge portion is connected or linked to the fixing support portion. The door portion may peel off or be detached, at the fragile portion, from the fixing support portion when the predetermined pressure is applied on the door portion, but remain to be attached or linked to the fixing support portion at least the hinge portion. Therefore, the door portion works as a lid, a cover, a closing member, or a plug for to seal the gas discharge port before the pressure is applied and opens by rupturing in the fragile portion. The single door portion may cover the two or three gas discharge portions.

The similar configurations, functions, and effects to the door portion are also applicable to the door portions in the other inventions mentioned hereinafter.

The first seal tape in accordance with the present invention may have, on a surface, an adhesive layer for attaching the seal tape to the housing, or the first seal tape may have no adhesive layer, but an adhesive may be coated (an adhesive layer is formed) on one surface of the first seal tape when the gas generator is manufactured. Such configurations are the same in each of the following inventions.

The linear fragile portions of the rupture portions are ruptured when a pressure is applied in the thickness direction of the seal tape and can be:

(1) linear fragile portions that are started from one edge in the width direction of the seal tape and extended linearly to the other end side, or (2) linear fragile portions that are started from a position set apart from one edge in the width direction of the seal tape and extended linearly to the other edge side.

The linear fragile portions may be in the form of continuous lines or discontinuous (broken) lines.

If necessary, the tips of linear fragile portions have a branched shape such as a T-like, Y-like, or cross-like shape. In the case of a linear fragile portion formed by a single line, there is one tip, in the case of a linear fragile portion with a branched tip such as a T-shaped or Y-shaped tip, there are two tips, and in the case of a linear fragile portion with a branched cross-shaped tip, there are three tips.

The rupture blocking portion serves to block the propagation of rupture when the linear fragile portion is ruptured and can be:

(1) a through hole of a round, elliptical or polygonal (with rounded corners) shape that is formed in contact with or close to the tip (one or two or more tips, depending on the shape) of the linear fragile portion;

(2) a thin portion of a round, elliptical or polygonal (with rounded corners) shape that is formed in contact with or close to the tip (one or two or more tips, depending on the shape) of the linear fragile portion; or (3) a thick portion formed in contact with or close to the tip (one or two or more tips, depending on the shape) of the linear fragile portion.

Where the linear fragile portion receives a pressure in the thickness direction, rupture propagates in the width direction of the seal tape, but when the rupture reaches the rupture blocking portion, the propagation of rupture is blocked by the external force dissipation action (in the above-mentioned cases (1) and (2)) or the external force attenuation action (in the above-mentioned case (3)) in the rupture blocking portion. As a result, the rupture is prevented from reaching the fixing support portion.

The linear fragile portions of rupture portions are formed equidistantly and equal in number to the plurality of gas discharge ports. In this case, the door portions equal in number to the gas discharge ports are formed.

The width (L1) of the band-like portion serving as the fixing support portion is within a range of 15 to 40%, preferably 20 to 30%, of the width (L) of the first seal tape.

Since the first seal tape in accordance with the present invention has a plurality of door portions (equal in number to the gas discharge ports) formed by the rupture portions and the fixing support portion, when the first seal tape closes, from the outside, a plurality of gas discharge ports formed in the housing of a gas generator for a restraining apparatus, the following specific functions and effects are exhibited.

First Functions and Effects (Functions and Effects by Rupture Portions)

The first functions and effects (functions and effects by rupture portions) is that when the gas generator is actuated and the first seal tape receives a pressure in the thickness direction thereof, the first seal tape is easily ruptured and opened (door-like opened) at linear fragile portions, thereby opening the gas discharge ports while preventing the generation of ruptured pieces (fragments) of the first seal tape. In this case, since the rupture blocking portions act to prevent the first seal tape from being entirely ruptured (that is, to prevent the door portions from dropping off from the fixing support portion), the fixed state attained by the fixing support portion is also maintained.

Second Functions and Effects (Functions and Effects by the Fixing Support Portion)

The second functions and effects (functions and effects by the fixing support portion) is that when the gas generator is actuated and the first seal tape receives a pressure in the thickness direction thereof, since the fixed state attained by the fixing support portion is maintained, door-like rupture in the linear fragile portions is promoted, the first seal tape is prevented from dropping off at actuation, and the formation of small fragments by the torn-off first seal tape that has been broken off.

In the second seal tape, the number of the linear fragile portions of the rupture portions is twice that of the gas discharge ports.

Therefore, when the plurality of gas discharge ports formed in the housing is closed from the outside by the second seal tape, a plurality of regions bounded by two linear fragile portions and the band-like portion of the fixing support portion assume a state in which the regions facing the gas discharge ports and the regions not facing the gas discharge ports are formed alternately in the longitudinal direction.

In this case, the regions that face the gas discharge ports become door portions (door portions equal in number to the gas discharge ports) and the regions except for the first fixing portions that do not face the gas discharge ports become the second fixing support portions.

Since the second seal tape has a plurality of door portions (door portions equal in number to the gas discharge ports), as mentioned hereinabove, the above-described first and second functions and effects are demonstrated.

The form of the linear fragile portions in the rupture portion in the third seal tape is different from that of the above-described first seal tape and second seal tape, but the third seal tape demonstrates the first functions and effects and the second functions and effects similarly to the above-described first and second seal tapes.

The linear fragile portions of the rupture portion are combined such as to form n−1 sides of a polygon (the total number of sides is n) and can be a combination of two sides (combination of two linear fragile portions) of a triangle or a combination of three sides (combination of three linear fragile portions) of a tetragon (square, rectangle, trapezoid, etc.).

The rupture blocking portions are formed to be in contact with or close to, for example, each tip of two sides in the case of a triangular shape and each tip of two opposing sides in the case of a tetragonal shape. The rupture blocking portions can be:

(1) a through hole of a round, elliptical or polygonal (with rounded corners) shape that is formed in contact with or close to the tips of the two sides;

(2) a thin portion of a round, elliptical or polygonal (with rounded corners) shape that is formed in contact with or close to the tips of the two sides; or (3) a thick portion formed in contact with or close to the tips of the two sides.

The fixing support portion is an outer region (excluding the rupture blocking portions) when the rupture portion (combination of linear fragile portions) is a perfect polygon. For example, when the rupture portion is a combination of two sides of a triangle, the fixing support portion is a region outside the triangle, and when the rupture portion is a combination of three sides of a tetragon, the fixing support portion is a region outside the tetragon.

The door portion is formed by the rupture portion and the fixing support portion (corresponding to the region bounded by the linear fragile portions but excluding the fixing support portion).

When the linear fragile portions of the rupture portion is in a square shape without one side, in case where a pressure is applied from the thickness direction, rupture propagates along three sides, one side of the square remaining intact, and the door portion (in the square door-like shape) is opened, thereby opening the gas discharge port. When the rupture reaches the rupture blocking portion, the propagation of rupture is blocked by the rupture blocking portion acting to dissipate the external force (in the case of (1) and (2) hereinabove) or attenuate the external force (in the case of (3) hereinabove).

In the present invention, the form of the linear fragile portion in the rupture portion is different from that of the above-described first to third seal tapes, but the fourth seal tape demonstrates the first functions and effects and the second functions and effects similarly to the above-described first to third seal tapes.

The linear fragile portion of the rupture portion is obtained by combining fragile portions so as to form a partial circle or a partial ellipse and can be cut out as a part of a circle (circular arc) or a part of an ellipse. When a partial elliptical shape is employed, the shape is preferably obtained by cutting perpendicular to the long axis of the ellipse.

A semicircle is preferred as a partial circle, and a semi-ellipse obtained by dividing an ellipse into two equal portions by cutting perpendicular to the long axis thereof is preferred as a partial ellipse.

The fragile portions are also obtained by combining a shape similar to a circle or an ellipse, for example, a shape obtained by cutting part of a polygon with rounded corners.

For example, where a fragile portion is obtained by cutting a part of the circle (for example, a semicircle), the rupture blocking portions are formed to be in contact with two tips of the cut circle, and when a fragile portion is obtained by cutting a part of an ellipse (for example, a semi-ellipse), the rupture blocking portions are formed to be in contact with or close to two tips of the cut ellipse. The rupture blocking portion can be:

(1) a through hole of a round, elliptical or round cornered polygonal shape that is formed in contact with or close to the two tips;

(2) a thin portion of a round, elliptical or round cornered polygonal shape that is formed in contact with or close to the two tips; or (3) a thick portion formed in contact with or close to the two tips.

The fixing support portion is an outer region (excluding the rupture blocking portions) when the rupture portion (combination of linear fragile portions) is a partial circle (for example, a semicircle) or a partial ellipse (for example, a semi-ellipse).

The door portion corresponds to an inner region when the rupture portion (combination of fragile portions) is a partial circle (for example, a semicircle) or a partial ellipse (for example, a semi-ellipse).

When a fragile portion of the rupture portion is a perfect ellipse missing a part (for example, a semi-ellipse obtained by dividing the long axis of an ellipse into two equal portions), rupture propagates so as to form the semi-ellipse, and a semi-elliptical opening is formed (semi-elliptical door is opened) when a pressure is applied in the thickness direction, thereby opening the gas discharge port. When the rupture reaches the rupture blocking portion, the propagation of rupture is blocked by the external force dissipation action (in the (1) and (2) hereinabove) or the external force attenuation action (in the (3) hereinabove) in the rupture blocking portion.

In the gas generator in accordance with the present invention, the gas discharge ports are closed from the outside by the above-mentioned seal tape (first to fourth seal tapes) so that door portions of the seal tape face the gas discharge ports.

In the gas generator in accordance with the present invention, the gas discharge ports are closed by attaching the seal tape from the outside of the housing. Therefore, the aforementioned configuration is advantageous for an elongated cylindrical housing to which a seal tape is difficult to attach from the inside.

In the gas generator in accordance with the present invention, the ratio (HL/HD) of a length (HL) of the housing to an outer diameter (HD) of the housing is preferably equal to or greater than 2, more preferably equal to or greater than 6, even more preferably equal to or greater than 10.

Further, in the gas generator in accordance with the present invention, the gas discharge ports are closed by attaching the seal tape from the outside of the housing. Therefore, the aforementioned configuration is particularly advantageous for an elongated cylindrical housing to which a seal tape is difficult to attach from the inside and in which the gas discharge ports are formed close to the center in the longitudinal direction of the cylindrical housing.

In the gas generator in accordance with the present invention, when both ends of the housing are open, as in a dual-type gas generator having two igniters (igniter assemblies), each of the igniters (igniter assemblies) or each of the closing members that close the openings is installed in each end of the cylindrical housing. In the case of such gas generator, the HL/HD ratio is preferably within the aforementioned range and the plurality of gas discharge ports are preferably formed within a range with a length from one side of 30 to 70%, more preferably 35 to 65%, even more preferably 40 to 60%, including a center position (½HL) of the length (HL) of the cylindrical housing.

In the gas generator in accordance with the present invention, in a case where the housing has a closed bottom obtained by closing, in advance, an opening at one end and an opening at the other end of the housing is closed (second closed portion) after constituent components including a gas generating agent have been accommodated therethrough, and where the ratio (HL/HD) of the length (HL) of the housing to the outer diameter (HD) of the housing is equal to or greater than 2, the plurality of gas discharge ports are preferably formed within a range equal to or greater than 0.2×HL, more preferably within a range equal to or greater than 0.35×HL, even more preferably within a range equal to or greater than 0.4×HL from the second closed portion.

With the gas generators using the first to fourth seal tapes, when the seal tape receives a gas pressure in the thickness direction in the process of gas discharge from the gas discharge ports at the time of actuation, the first functions and effects and second functions and effects of the seal tape are exhibited. Therefore, the seal tape is instantaneously ruptured and door-like opened in the rupture portions, the gas discharge ports are opened, and the gas is discharged. Further, the fixing support portion remains attached to the outer wall surface of the housing, and the seal tape itself is prevented from dropping off and being cut into pieces.

With the method for manufacturing a gas generator in accordance with the present invention, the gas discharge ports are closed by attaching the seal tape (first to fourth seal tapes) from the outside of the housing. Therefore this method is easily applied to a cylindrical housing of an elongated shape to which the seal tape is difficult to attach from the inside.

The method for manufacturing a gas generator in accordance with the present invention is advantageous for manufacturing a gas generator in which a ratio (HL/HD) of a housing length (HL) to an outer diameter (HD) of the housing is equal to or greater than 2, preferably equal to or greater than 6, and even more preferably equal to or greater than 10.

With the method for manufacturing a gas generator in accordance with the present invention, the gas discharge ports are closed by attaching the seal tape from the outside of the housing. Therefore this method is easily applied to a cylindrical housing of an elongated shape to which the seal tape is difficult to attach from the inside and in which the gas discharge ports are formed close to the center in the longitudinal direction of the cylindrical housing.

With the method for manufacturing a gas generator in accordance with the present invention, when both ends of the housing are open, as in a dual-type gas generator having two igniters (igniter assemblies), each of the igniters (igniter assemblies) or each of the closing members that close the openings is installed in each end of the cylindrical housing. In the case of such method for manufacturing a gas generator, the HL/HD ratio is preferably within the aforementioned range and the plurality of gas discharge ports are preferably formed within a range with a length from one side of 30 to 70%, more preferably 35 to 65%, even more preferably 40 to 60%, including a center position (½HL) of the length (HL) of the cylindrical housing.

With the method for manufacturing a gas generator in accordance with the present invention, in case where the housing has a closed bottom obtained by closing in advance an opening at one end, and an opening at the other end of the housing is closed (second closed portion) after constituent components including a gas generating agent have been accommodated therethrough, and where the ratio (HL/HD) of the length (HL) of the housing to the outer diameter (HD) of the housing is equal to or greater than 2, the plurality of gas discharge ports are preferably formed within a range equal to or greater than 0.2×HL, more preferably within a range equal to or greater than 0.35×HL, even more preferably within a range equal to or greater than 0.4× HL from the second closed portion.

The method for manufacturing a gas generator in accordance with the present invention additionally includes a step of covering the seal tape with a protective material so as to prevent the seal tape attached to the outer side of the housing from damage when the product (gas generator) is stored, transported, or assembled in a modular case.

A material such as a sheet of plastic, rubber, nonwoven fabric, woven fabric, paper, or composites (laminates) thereof is used as the protective material.

The seal tape in accordance with the present invention is used for closing gas discharge ports by being attached from the outside of the housing of a gas generator.

In the gas generator in which the gas discharge ports are closed using the seal tape in accordance with the present invention, the seal tape is door-like opened to open gas discharge ports at actuation. Therefore, the actuation performance is not degraded, and the seal tape is not torn off and does not generate small fragments.

With the method for manufacturing a gas generator by using the seal tape in accordance with the present invention, since the seal tape may be attached from the outside, the manufacturing process is facilitated, and it is particularly easy to manufacture a gas generator having a housing of an elongated shape or a gas generator in which the gas discharge ports are located in the central location, in the longitudinal direction, of the housing or close thereto.

EMBODIMENTS OF INVENTION

The invention includes the following preferable embodiments of invention 1, 4, 5, 6, 10 and 14, shown above.

Embodiment 2

The seal tape according to invention 1, wherein the linear fragile portions are equal in number to the plurality of gas discharge ports, and the linear fragile portions are formed equidistantly and form the door portions equal in number to the gas discharge ports.

Embodiment 3

The seal tape according to invention 1 or embodiment 2, wherein the width (L1) of the band-like portion serving as the fixing support portion is within a range of 15 to 40% of a width (L) of the seal tape.

Embodiment 7

The seal tape according to any one of invention 1 and 4 to 6 and embodiments 2 and 3, wherein the rupture blocking portion is a through hole of a round, elliptical, or round cornered polygonal shape provided in contact with a tip portion of the linear fragile portion forming the rupture portion.

Embodiment 8

The seal tape according to any one of invention 1 and 4 to 6 and embodiments 2 and 3, wherein the rupture blocking portion is a thin portion of a round, elliptical, or round cornered polygonal shape provided in contact with a tip portion of the linear fragile portion forming the rupture portion.

Embodiment 9

The seal tape according to any one of invention 1 and 4 to 6 and embodiments 2 and 3, wherein the rupture blocking portion is a thick portion provided in contact with a tip portion of the linear fragile portion forming the rupture portion.

Embodiment 10

A gas generator for a restraining apparatus that accommodates a gas generating agent in a housing having a plurality of gas discharge ports, including:

the gas discharge ports closed, from the outside, by the seal tape according to any one of embodiments 2, 3, 7, 8 and 9, so that door portions of the seal tape face the gas discharge ports.

Embodiment 11

The gas generator for a restraining apparatus according to invention 10, wherein the housing has a cylindrical shape and a ratio (HL/HD) of a length (HL) of the housing to an outer diameter (HD) of the housing is equal to or greater than 2.

Embodiment 12

The gas generator for a restraining apparatus according to invention 10 or embodiment 11, wherein the housing has a cylindrical shape and a ratio (HL/HD) of a length (HL) of the housing to an outer diameter (HD) of the housing is equal to or greater than 2; and the plurality of gas discharge ports are formed within a range of a length from one side of 30-70% (of a length (HL)) including a center position (½HL) of the length (HL) of the housing.

Embodiment 13

The gas generator for a restraining apparatus according to invention 10 or embodiment 11, wherein the housing has a closed bottom obtained by closing, in advance, an opening at one end, and an opening at the other end of the housing is closed (second closed portion) after constituent components including a gas generating agent have been accommodated therethrough;

a ratio (HL/HD) of a length (HL) of the housing to an outer diameter (HD) of the housing is equal to or greater than 2; and the plurality of gas discharge ports are formed within a range equal to or greater than 0.2×HL from the second closed portion.

Embodiment 14

A method for manufacturing a gas generator for a restraining apparatus in which a gas generating agent is accommodated in a housing having a plurality of gas discharge ports, including a step of closing the plurality of gas discharge ports from the outside with the seal tape according to any one of embodiments 2, 3, 7, 8 and 9, so that door portions of the seal tape face the gas discharge ports.

Embodiment 15

The method for manufacturing a gas generator for a restraining apparatus according to invention 14, wherein the housing has a cylindrical shape and a ratio (HL/HD) of a length (HL) of the housing to an outer diameter (HD) of the housing is equal to or greater than 2.

Embodiment 16

The method for manufacturing a gas generator for a restraining apparatus according to invention 14 or embodiment 15, wherein the housing has a cylindrical shape and a ratio (HL/HD) of a length (HL) of the housing to an outer diameter (HD) of the housing is equal to or greater than 2; and the plurality of gas discharge ports are formed within a range of a length from one side of 30-70% of the length (HL) including a center position (½HL) of the length (HL) of the housing.

Embodiment 17

The method for manufacturing a gas generator for a restraining apparatus according to invention 10 or embodiment 11, wherein the housing has a closed bottom obtained by closing, in advance, an opening at one end, and an opening at the other end of the housing is closed (second closed portion) after constituent components including a gas generating agent have been accommodated therethrough;

a ratio (HL/HD) of a length (HL) of the housing to an outer diameter (HD) of the housing is equal to or greater than 2; and the plurality of gas discharge ports are formed within a range equal to or greater than 0.2×HL from the second closed portion.

Embodiment 18

The method for manufacturing a gas generator for a restraining apparatus according to any one of invention 14 and embodiments 15 to 17, comprising a step of covering the seal tape with a protective material after the plurality of gas discharge ports are closed from the outside with the seal tape according to any one of invention 1, 4, 5 and 6 and embodiments 2, 3, 7, 8 and 9.

(1) Seal Tape Shown in (a) and (b) in FIG. 1 (First Seal Tape)

The first seal tape in accordance with the present invention will be explained with reference to (a) and (b) in FIG. 1.

The first seal tape in accordance with the present invention closes, from the outside, a plurality of gas discharge ports formed in a housing of a gas generator for a restraining apparatus such as an airbag apparatus.

The first seal tape in accordance with the present invention is made of a metal such as aluminum or stainless steel.

The first seal tape in accordance with the present invention may have, on one surface, an adhesive layer for attaching the seal tape to the housing, or the first seal tape may have no adhesive layer, but an adhesive is coated (an adhesive layer is formed) on one surface of the first seal tape when the gas generator is manufactured.

A gas discharge port 113 shown in (a) and (b) in FIG. 1 indicates the position of a gas discharge port when the gas discharge port formed in the housing of the gas generator is closed from the outside by the first seal tape.

In a seal tape 10A shown in FIG. 1(a), a plurality of rupture portions 12 is formed in the width direction (direction from one edge 11a to the other edge 11b), with a distance in the longitudinal direction, on a band-like base member 11.

The rupture portion 12 includes a linear fragile portion 13 that is ruptured when a pressure is applied in the thickness direction of the seal tape 10A and a rupture blocking portion 14 for blocking the propagation of rupture at the tip of the linear fragile portion 13.

The linear fragile portion 13 is formed from the edge 11a of the seal tape 10A and extended linearly to the opposite edge 11b.

The linear fragile portion 13 does not have to reach the edge 11a and may be formed from a position with a small distance from the edge 11a toward the edge 11b, unlike the one shown in FIG. 1(a), provided that the linear fragile portion is ruptured when a pressure is applied in the thickness direction.

The linear fragile portion 13 includes a fragile portion such as a linear slit (notch) or a linear cut.

The distance between the linear fragile portions 13 in the longitudinal direction of the seal tape 10A is larger than the diameter of the gas discharge port 113 and adjusted such that when the plurality of gas discharge ports 113 is closed from the outside of the housing, the linear fragile portions 13 and the gas discharge ports 113 do not overlap in the thickness direction. In (a) in FIG. 1, the linear fragile portions 13 are formed equidistantly in the longitudinal direction, the number thereof being equal to that of the gas discharge ports 113 closed by the attached seal tape 10A.

The rupture blocking portion 14 is formed by a round through hole penetrating through the seal tape 10A in the thickness direction. The rupture blocking portion is formed in contact with the tip of the linear fragile portion 13.

The rupture blocking portion (through hole) 14 acts to dissipate the external force applied in the extension direction of the linear fragile portion 13 and block the propagation of rupture when the seal tape 10A is ruptured at the linear fragile portion 13. Accordingly, it is preferred that the rupture blocking portion (through hole) 14 have a round or elliptical shape, and when it has a polygonal shape, it is preferred that the corners be rounded.

In order to enhance the rupture blocking action, the mutual arrangement of the rupture blocking portion 14 and the linear fragile portion 13 is adjusted such that the center of the rupture blocking portion (through hole) 14 is present on the extension line of the linear fragile portion 13.

The rupture blocking portions 14 can be also in the form of a thin portion having the same shape as the through hole. When the rupture blocking portion 14 is a thin portion, it is preferred that the thickness thereof be equal to or less than 50% of the thickness of other portions (base member 11).

A fixing support portion 15 is a band-like portion within a range of a predetermined width (L1) from the edge 11b in which rupture portions 12 are not formed.

The length of the fixing support portion 15 is the length of the seal tape 10A.

The width (L1) of the fixing support portion 15 is preferably within a range of 15 to 40%, more preferably 20 to 30%, of the width (L) of the seal tape 10A.

In (a) in FIG. 1, a region bounded by two adjacent rupture portions 12 and the fixing support portion 15, and facing the gas discharge ports 113 when the gas discharge ports 113 of the housing are closed becomes a door portion 16 that is open when a pressure is applied from the thickness direction at actuation and opens the gas discharge port 113. The number of the door portions 16 is equal to that of the gas discharge ports 113.

FIG. 1(b) illustrates a state in which the gas discharge ports 113 that have been closed by the seal tape 10A are opened when the door portions 16 are open through 180° to the opposite side due to a pressure applied from the thickness direction at actuation.

FIG. 1(b) serves to facilitate the understanding of the operation of the door portions 16 and does not mean that the door portions 16 are necessarily open in the manner shown in FIG. 1(b). Further, the state of change of the rupture blocking portions (round through holes) 14 is also not shown in the drawing.

Figure 2:
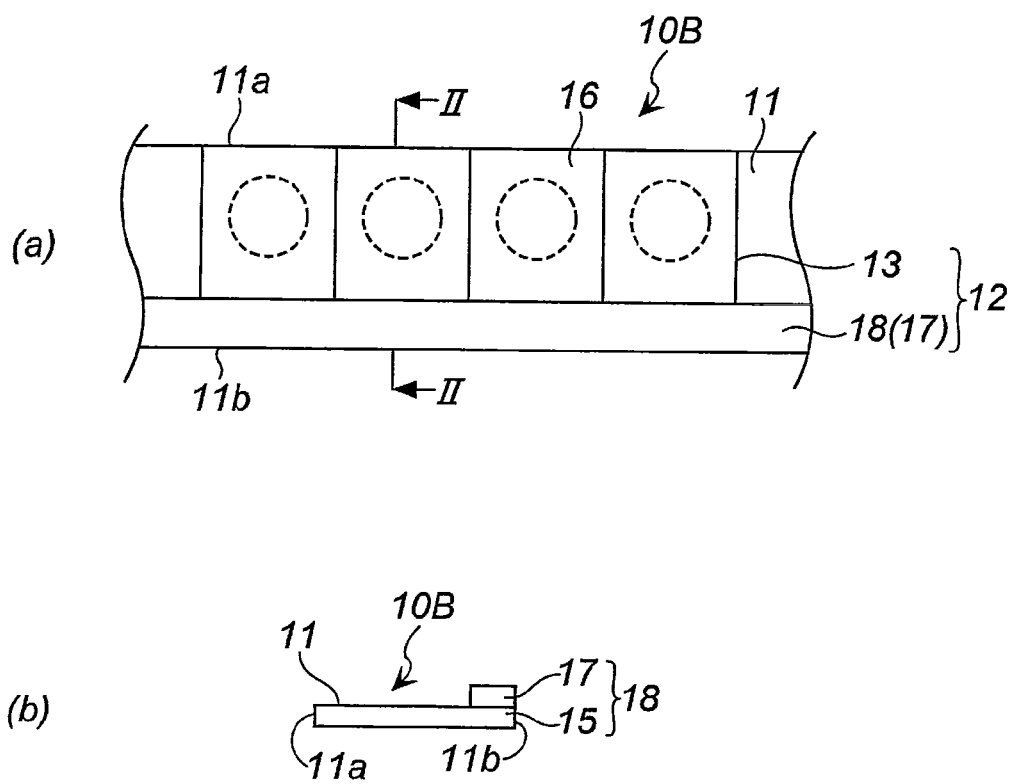
FIG. 2 shows, in (*a*), a plan view illustrating another embodiment (first seal tape) of the seal tape of the present invention, and, in (*b*), a cross-sectional view taken along the II-II line in (*a*)

(2) Seal Tape (First Seal Tape) Shown in (a) and (b) in FIG. 2.

Another embodiment of the first seal tape in accordance with the present invention will be explained below with reference to (a) and (b) in FIG. 2.

A seal tape 10B shown in FIG. 2(a) is the same as the seal tape 10A shown in FIG. 1(a), except that the rupture blocking portion of the rupture portion is different.

A rupture blocking portion 18 is a thick portion formed to be in contact with the tips of linear fragile portions 13.

As shown in FIG. 2(b), the rupture blocking portion 18 is a thick portion formed by attaching a band-like member 17 (made of the same material as the seal tape 10B) to a part of the base member 11 corresponding to the fixing support portion 15 shown in FIG. 1(a).

The rupture blocking portion 18 may be formed integrally to have a cross-sectional shape shown in FIG. 2(b).

The width of the rupture blocking portion 18 can be equal to L1 shown in FIG. 1(a). The length of the rupture blocking portion 18 may be in the range in which the linear fragile portions 13 are formed, but also can be equal to that of the seal tape 10B.

The thickness (T2) of the rupture blocking portion 18 is larger than the thickness (T1) of the portion where the linear fragile portions 13 are formed (namely, thickness of the base member 11). It is preferred that the thickness ratio (T2/T1) of T2 and T1 be equal to or greater than 1.5, more preferably within a range of 1.5 to 3.0.

Figure 3:
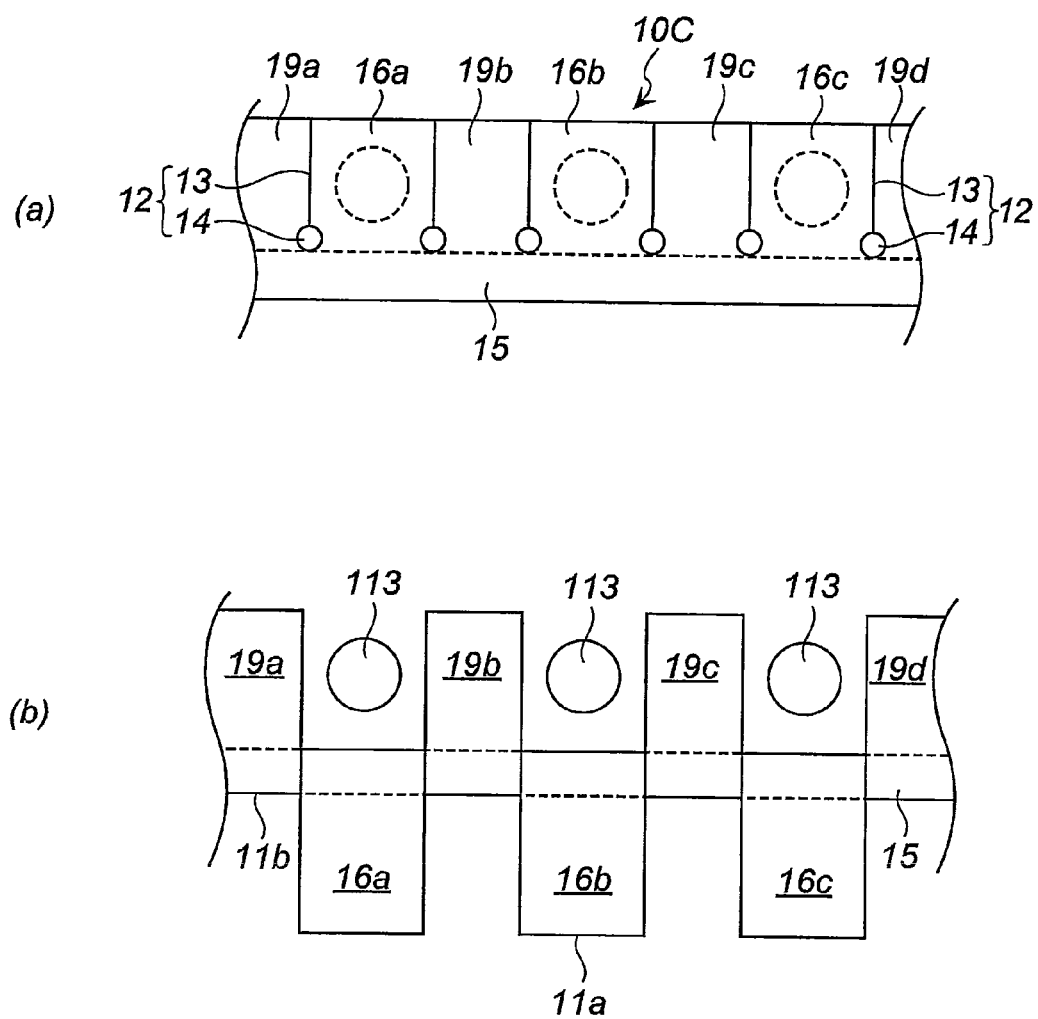
FIG. 3 shows, in (*a*) and (*b*), plan views illustrating another embodiment (second seal tape) of the seal tape of the present invention.

(3) Seal Tape (Second Seal Tape) Shown in (a) and (b) in FIG. 3.

The second seal tape in accordance with the present invention will be explained below with reference to (a) and (b) in FIG. 3.

The second seal tape in accordance with the present invention closes, from the outside, a plurality of gas discharge ports formed in a housing of a gas generator for a restraining apparatus such as an airbag apparatus.

The second seal tape in accordance with the present invention is made of a metal such as aluminum or stainless steel.

The second seal tape in accordance with the present invention may have, on one surface, an adhesive layer for attaching the seal tape to the housing, or the second seal tape may have no adhesive layer, but an adhesive is coated (an adhesive layer is formed) on one surface of the second seal tape when the gas generator is manufactured.

A gas discharge port 113 shown in (a) and (b) in FIG. 3 indicates the position of a gas discharge port when the gas discharge port formed in the housing of the gas generator is closed from the outside by the second seal tape.

A linear fragile portion 13 and a rupture blocking portion 14 forming a rupture portion 12 in a seal tape 10C shown in FIG. 3(a) are the same as those of the seal tape 10A shown in FIG. 1(a).

However, the number of the rupture portions 12 shown in FIG. 3(a) is twice that of gas discharge ports 113 closed by the attached seal tape 10C, and the rupture portions are formed with a distance in the longitudinal direction of the seal tape 10C.

In the seal tape 10C shown in FIG. 3(a), a fixing support portion includes a first fixing support portion 15 and second fixing support portions 19a to 19d.

The first fixing support portion 15 is a band-like portion within a range of a predetermined length (L1) from an edge 11b in which rupture portions 12 are not formed. The length of the first fixing support portion 15 is equal to that of the seal tape 10C.

The second fixing support portions 19a to 19d corresponds to a region that does not face the gas discharge port 113 when the plurality of gas discharge ports 113 is closed from the outside, this region being sandwiched in the longitudinal direction by two rupture portions 12.

The width (L1) of the first fixing support portion 15 can be equal to L1 shown in FIG. 1(a), but also can be less than L1 shown in FIG. 1(a) since the attaching force is enhanced by the second fixing support portions 19a to 19d.

Therefore, the length of the rupture portions 12 is increased (width L1 is further decreased) even when the tape width (L) is equal to that of the seal tape 10A shown in FIG. 1(a). As a result, larger gas discharge ports are closed even when the tape width (L) is equal to that of the seal tape 10A shown in FIG. 1(a).

In the seal tape 100 shown in FIG. 3(a), when the plurality of gas discharge ports 113 formed in the housing is closed from the outside, a plurality of regions bounded by the rupture portions 12 and the first fixing support portion 15 is present, and the regions (door portions 16a to 16c) facing the gas discharge ports 113 and the regions (second fixing support portions 19a to 19d) that do not face the gas discharge ports 113 are formed alternately in the longitudinal direction.

FIG. 3(b) shows a state in which the gas discharge ports 113 that have been closed with the seal tape 100 are opened when the door portions 16a to 16c are opened through 180° to the opposite side due to a pressure applied from the thickness direction at actuation.

In this case, since the seal tape 100 is attached to the housing not only by the first fixing support portion 15, but also by the second fixing support portions 19a to 19d, the surface area of attaching to the housing is increased by comparison with those of the seal tape 10A shown in FIG. 1(a) and the seal tape 10B shown in FIG. 2(a).

Therefore, with the seal tape 100 shown in FIG. 3(a), the second functions and effects is exhibited easier than with the seal tape 10A shown in FIG. 1(a) and the seal tape 10B shown in FIG. 2(a).

Figure 4:
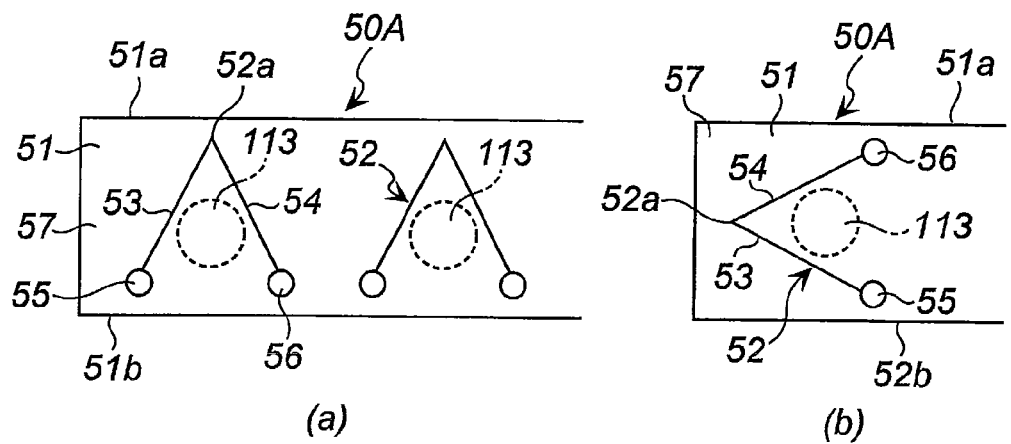
FIG. 4 shows, in (*a*) and (*b*), plan views illustrating another embodiment (third seal tape) of the seal tape of the present invention.
Figure 5:
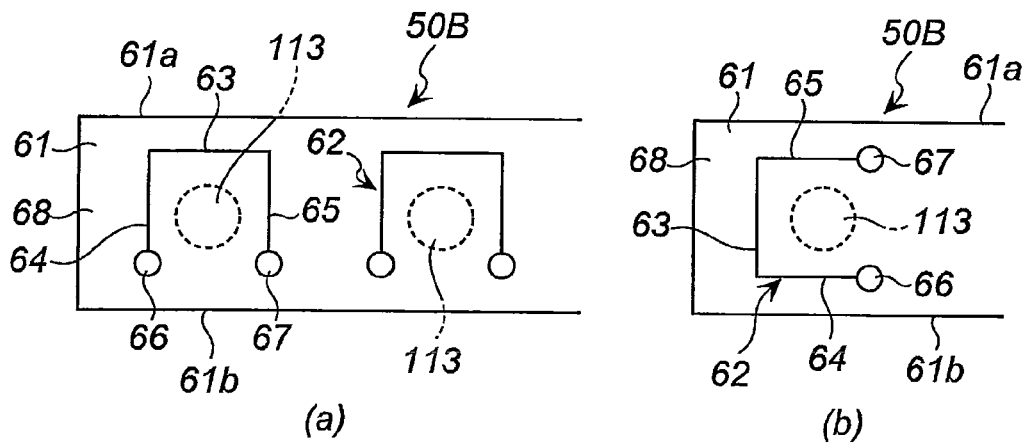
FIG. 5 shows, (*a*) and (*b*), plan views illustrating another embodiment (third seal tape) of the seal tape of the present invention; (*c*) a view of the third seal tape with a portion thereof ruptured.
Figure 5:
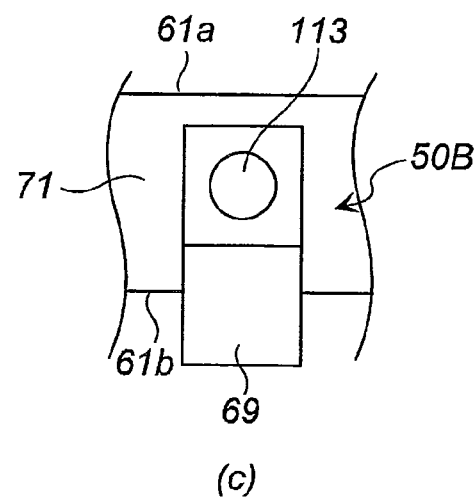

(4) Seal Tape (Third Seal Tape) Shown in FIGS. 4 and 5

The third seal tape in accordance with the present invention will be explained below with reference to FIGS. 4 and 5. The third seal tape in accordance with the present invention closes, from the outside, a plurality of gas discharge ports formed in a housing of a gas generator for a restraining apparatus such as an airbag apparatus.

The third seal tape in accordance with the present invention is made of a metal such as aluminum or stainless steel.

The third seal tape in accordance with the present invention may have, on one surface, an adhesive layer for attaching the seal tape to the housing, or the third seal tape may have no adhesive layer, but an adhesive is coated (an adhesive layer is formed) on one surface of the third seal tape when the gas generator is manufactured.

A gas discharge port 113 shown in FIGS. 4 and 5 indicates the position of a gas discharge port when the gas discharge port formed in the housing of the gas generator is closed from the outside by the third seal tape.

(4-1) Seal Tape 50A Shown in FIG. 4

In the seal tape 50A shown in FIG. 4(a), a plurality of rupture portions 52 is formed in the width direction (direction from one edge 51a to the other edge 51b), with a distance in the longitudinal direction, on a band-like base member 51.

The rupture portion 52 is formed by a combination of linear fragile portions 53, 54 that are ruptured when a pressure is applied in the thickness direction of the seal tape 50A and rupture blocking portions 55, 56 for preventing the propagation of rupture.

The linear fragile portions 53, 54 are two linear fragile portions combined to form two sides of a triangle.

The linear fragile portions 53, 54 are fragile portions such as linear slits (notches) or linear cuts.

When the fragile portions 53, 54 form perfect triangles (triangular door portions), the gas discharge port 113 is in such a size as to be enclosed therein without coming into contact with each side of the perfect triangle.

The rupture blocking portions 55, 56 are formed by round through holes penetrating through the seal tape 50A in the thickness direction and formed to be in contact with the tips of the fragile portions 54. Thin portions of the same shape can be formed instead of the through holes.

The rupture blocking portions (through holes) 55, 56 act to dissipate an external force applied in the extension direction of the fragile portions 53, 54 and prevent the propagation of rupture when the seal tape 50A is ruptured at the fragile portions 53, 54. Accordingly, it is preferred that the rupture blocking portions (through holes) 55, 56 have a round or elliptical shape, and when they has a polygonal shape, it is preferred that the corners be rounded.

In order to enhance the rupture blocking action, the mutual arrangement of the rupture blocking portions 55, 56 and the fragile portions 53, 54 is adjusted such that the centers of the rupture blocking portions (through holes) 55, 56 are present on the extension lines of the fragile portions 53, 54.

The fixing support portion 57 is an outside region (rupture blocking portions 55, 56 are not included) when the rupture portions 52 (linear fragile portions 53, 54) have a perfect triangular shape. The base member 51 and the fixing support portion 57 mostly duplicate each other, but the base member 51 is distinguished from the fixing support portion regarding the presence of sections including the rupture portions 52 in the base member 51.

A door portion corresponds to the inner region when the rupture portion 52 (linear fragile portions 53, 54) has a perfect triangular shape, and one side thereof (the side connecting the linear fragile portions 53, 54) is in contact with the fixing support portion 57.

With the gas discharge port 113 of the gas generator closed by the seal tape 50A shown in FIG. 4(a), when the linear fragile portions 53, 54 are ruptured by the pressure acting in the thickness direction, one side of the triangle (the side connecting the linear fragile portions 53, 54) remaining intact, a triangular door is opened and the gas discharge port 113 is entirely opened.

The seal tape 50A shown in FIG. 4(b) is the same to the seal tape 50A shown in FIG. 4(a), except that the orientation of the fragile (rupture portion 52 is different.

In the seal tape 50A shown in FIG. 4(a), a contact point (corner) 52a of the liner fragile portions 53, 54 faces in the width direction (direction toward the edge 51a), whereas in the seal tape 50A shown in FIG. 4(b), a contact point (corner) 52a of the linear fragile portions 53, 54 faces in the longitudinal direction.

In the seal tapes 50A shown in FIGS. 4(a) and 4(b), the surface area of the fixing support portion is increased by comparison with that of the seal tapes 10A and 10B shown in FIGS. 1 and 2, thereby facilitating the demonstration of the second functions and effects.

(4-2) Seal Tape 50B Shown in FIG. 5

In the seal tape 50B shown in FIG. 5(a), a plurality of rupture portions 62 is formed in the width direction (direction from one edge 61a to the other edge 61b) with a distance in the longitudinal direction on a band-like base member 61.

The rupture portion 62 is formed by a combination of linear fragile portions 63, 64, 65 that are ruptured when a pressure is applied in the thickness direction of the seal tape 50B and rupture blocking portions 66, 67 for preventing the propagation of rupture.

The linear fragile portions 63, 64, 65 are three linear fragile portions combined to form three sides of a square.

The linear fragile portions 63, 64, 65 are fragile portions such as linear slits (notches) or a linear cuts.

When the linear fragile portions 63, 64, 65 form a perfect square (square door portion), the gas discharge port 113 is enclosed therein without coming into contact with each side of the perfect square.

The rupture blocking portions 66, 67 are round through holes penetrating through the seal tape 50B in the thickness direction and formed to be in contact with the tips of the linear fragile portions 64, 65. Thin portions of the same shape can be formed instead of the through holes.

The rupture blocking portions (through holes) 66, 67 act to dissipate an external force applied in the extension direction of the linear fragile portions 64, 65 and prevent the propagation of rupture when the seal tape 50B is ruptured at the linear fragile portions 63, 64, 65. Accordingly, it is preferred that the rupture blocking portions (through holes) 66, 67 have a round or elliptical shape, and when they have a polygonal shape, it is preferred that the corners be rounded.

In order to enhance the rupture blocking action, the mutual arrangement of the rupture blocking portions 66, 67 and the linear fragile portions 64, 65 is adjusted such that the centers of the rupture blocking portions (through holes) 66, 67 are present on the extension lines of the linear fragile portions 64, 65.

The fixing support portion 68 is an outside region (rupture blocking portions 66, 67 are not included) when the rupture portions 62 (linear fragile portions 63, 64, 65) have a perfect square shape. The base member 61 and the fixing support portion 68 mostly duplicate each other, but the base member 61 is distinguished from the fixing support portion regarding the presence of sections including the rupture portions 62 in the base member 61.

A door portion 69 (FIG. 5(c)) corresponds to the inner region when the rupture portion 62 (linear fragile portions 63, 64, 65) has a perfect square shape, and one side thereof (the side connecting the linear fragile portions 64, 65) is in contact with the fixing support portion 68.

With the gas discharge port 113 of the gas generator closed by the seal tape 50B, when the linear fragile portions 63, 64, 65 are ruptured by the pressure acting in the thickness direction, one side (the side connecting the linear fragile portions 64, 65) remaining intact, the square door 69 is opened as shown in FIG. 5(c) and the gas discharge port 113 is entirely opened.

The seal tape 50B shown in FIG. 5(b) is the same to the seal tape 50B shown in FIG. 5(a), except that the orientation of the rupture portion 62 is different.

In the seal tape 50B shown in FIG. 5(a), the linear fragile portion 63 is oriented in the direction perpendicular to the width direction (direction parallel to the longitudinal direction), whereas in the seal tape 50B shown in FIG. 5(b), the linear fragile portion 63 is oriented in the direction parallel to the width direction (direction perpendicular to the longitudinal direction).

In the seal tapes 50B shown in (a) and (b) in FIGS. 5, the surface area of the fixing support portion is increased by comparison with that of the seal tapes 10A and 10B shown in FIGS. 1 and 2, thereby facilitating the demonstration of the second functions and effects.

Figure 6:
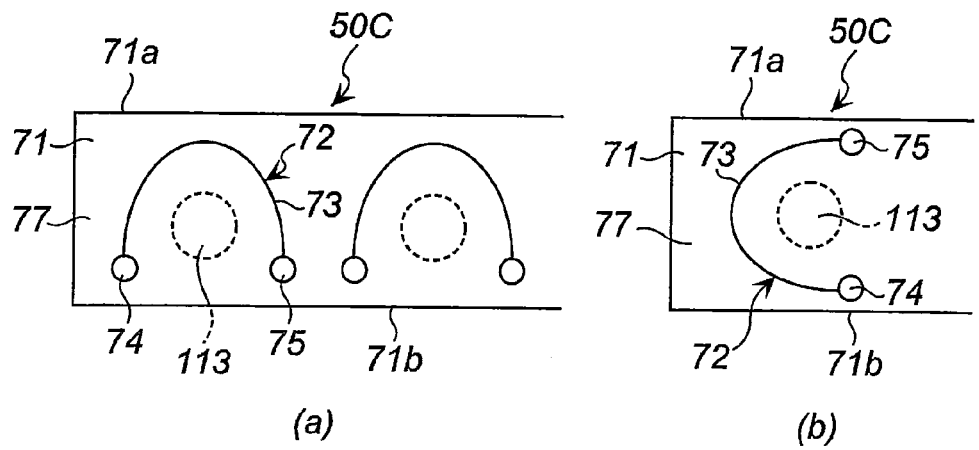
FIG. 6 shows, in (*a*) and (*b*), plan views illustrating another embodiment (fourth seal tape) of the seal tape of the present invention.

(5) Seal Tape (Fourth Seal Tape) Shown in FIG. 6

The fourth seal tape in accordance with the present invention will be explained below with reference to FIG. 6. The fourth seal tape in accordance with the present invention closes, from the outside, a plurality of gas discharge ports formed in a housing of a gas generator of a restraining apparatus such as an airbag apparatus.

The fourth seal tape in accordance with the present invention is made of a metal such as aluminum or stainless steel.

The fourth seal tape in accordance with the present invention may have, on one surface, an adhesive layer for attaching the seal tape to the housing, or the fourth seal tape may have no adhesive layer, but an adhesive is coated (an adhesive layer is formed) on one surface of the fourth seal tape when the gas generator is manufactured.

A gas discharge port 113 shown in FIG. 6 indicates the position of a gas discharge port when the gas discharge port formed in the housing of the gas generator is closed from the outside by the fourth seal tape.

In a seal tape 50C shown in FIG. 6(a), a plurality of rupture portions 72 is formed in a width direction (direction from one edge 71a to the other edge 71b), with a distance in the longitudinal direction, on a band-like base member 71.

The rupture portion 72 is formed by a combination of a fragile portion 73 that is ruptured when a pressure is applied in the thickness direction of the seal tape 50C and rupture blocking portions 74, 75 for blocking the propagation of rupture of the fragile portion 73.

The fragile portion 73 has a semi-elliptical shape (an ellipse in which a long axis is divided into two equal portions).

The fragile portion 73 is a fragile portion such as a curved slit (notch) or a curved cut.

The inner region of the fragile portion 73 serves as a semi-elliptical door portion, and a gas discharge port 113 is enclosed therein without coming into contact with the outer periphery of the semi-ellipse. With such dimensional relationship of the door portion and the gas discharge port 113, and with the gas discharge port 113 of the gas generator closed by the seal tape 50C, when the fragile portion 73 is ruptured by a pressure acting in the thickness direction, the fragile portion opens as a semi-elliptical door and the gas discharge port 113 is entirely opened.

The rupture blocking portions 74, 75 are round through holes penetrating through the seal tape 50C in the thickness direction. The rupture blocking portions are formed in contact with the two tips of the fragile portion 73. Through holes may be replaced with thin portions.

The rupture blocking portions (through holes) 74, 75 act to dissipate the external force applied in the extension direction of the two tips of the fragile portion 73 and block the propagation of rupture when the seal tape 50C is ruptured semi-elliptically at the fragile portion 73. Accordingly, it is preferred that the rupture blocking portions (through holes) 74, 75 have a round or elliptical shape, and when it has a polygonal shape, it is preferred that the corners be rounded.

In order to enhance the rupture blocking action, the mutual arrangement of the rupture blocking portions 74, 75 and the two tips of the fragile portion 73 is adjusted such that the centers of the rupture blocking portions (through holes) 74, 75 are present on the extension line of the two tips of the fragile portion 73.

The fixing support portion 77 is an outside region (rupture blocking portions 74, 75 are not included) when the rupture portions 72 (fragile portions 73) have a perfect semi-elliptical shape. The base member 71 and the fixing support portion 77 mostly duplicate each other, but the base member 71 is be distinguished from the fixing support portion regarding the presence of sections including the rupture portions 72 in the base member 71.

A door portion corresponds to the inner region when the rupture portion 72 (fragile portion 73) has a semi-elliptical shape, and one side thereof (the side connecting the two tips of the fragile portion 73) is in contact with the fixing support portion 77.

With the gas discharge port 113 of the gas generator closed by the seal tape 50C, when the fragile portion 73 is ruptured by the pressure acting in the thickness direction, the one side thereof (the side connecting the two tips of the fragile portion 73) remaining intact, a semi-elliptical door is opened and the gas discharge port 113 is entirely opened.

The seal tape 50C shown in FIG. 6(b) is the same to the seal tape 50C shown in FIG. 6(a), except that the orientation of the rupture portion 72 is different.

In the seal tape 50C shown in FIG. 6(a), the curved portion of the fragile portion 73 faces in the width direction (direction toward the edge 71a), whereas in the seal tape 50C shown in FIG. 6(b), the curved portion of the fragile portion 73 faces in the longitudinal direction.

In the seal tapes 50C shown in (a) and (b) of FIG. 6, the surface area of the fixing support portion is increased by comparison with that of the seal tapes 10A and 10B shown in FIGS. 1 and 2, thereby facilitating the demonstration of the second functions and effects.

Figure 7:
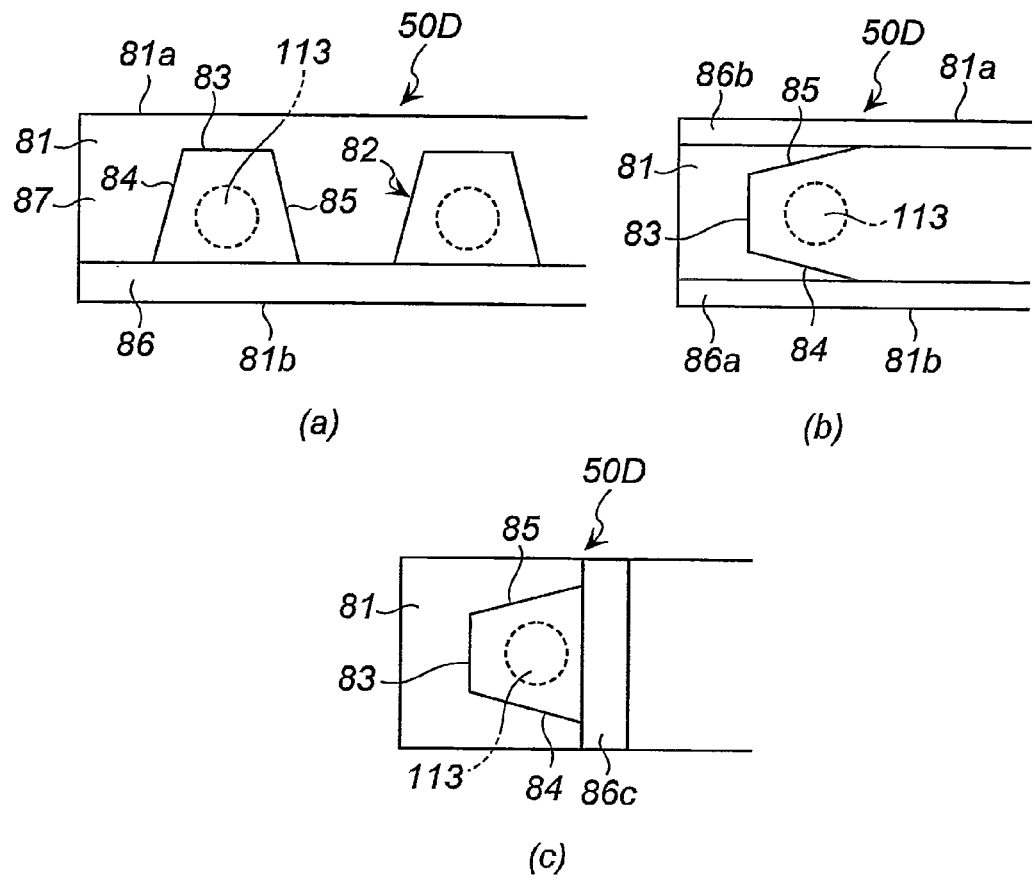
FIG. 7 shows, in (*a*), (*b*) and (*c*), plan views illustrating another embodiment (third seal tape) of the seal tape of the present invention.

(6) Seal Tapes (Third Seal Tape and Fourth Seal Tape) Shown in FIG. 7

The seal tapes 50D shown in (a), (b), and (c) of FIG. 7 are realized as the third seal tape and the fourth seal tape, but in (a), (b) and (c) of FIG. 7, the embodiment as the third seal tape is explained.

In the seal tape 50D shown in FIG. 7(a), a plurality of rupture portions 82 is formed in the width direction (direction from one edge 81a to the other edge 81b), with a distance in the longitudinal direction, on a band-like base member 81.

The rupture portion 82 is formed by a combination of linear fragile portions 83, 84, 85 that are ruptured when a pressure is applied in the thickness direction of the seal tape 50D and a rupture blocking portion 86 for preventing the propagation of rupture from the tips of the linear fragile portions 84, 85.

The linear fragile portions 83, 84, 85 are three linear fragile portions combined to form three sides of a trapezoid.

The linear fragile portions 83, 84, 85 are fragile portions such as linear slits (notches) or a linear cuts.

When the linear fragile portions 83, 84, 85 form a perfect trapezoid (trapezoidal door portions), the gas discharge port 113 is enclosed therein without coming into contact with each side of the perfect trapezoid. With such dimensional relationship of the linear fragile portions 83, 84, 85 and the gas discharge port 113, and with the gas discharge port 113 of the gas generator closed by the seal tape 50D, when the linear fragile portions 83, 84, 85 are ruptured by a pressure acting in the thickness direction, one side of the trapezoid remaining intact, the trapezoidal door is opened and the gas discharge port 113 is entirely opened.

The rupture blocking portion 86 is a thick portion formed to be in contact with the tips of the linear fragile portions 84, 85.

The rupture blocking portion 86 is a thick portion formed as shown in (a) and (b) in FIG. 2.

The thickness (T2) of the rupture blocking portion 86 is larger than the thickness (T1) of the base member 81. It is preferred that the thickness ratio (T2/T1) of T2 and T1 be equal to or greater than 1.5, more preferably within a range of 1.5 to 2.5.

The fixing support portion 87 is an outside region when the rupture portions 82 (linear fragile portions 83, 84, 85) have a perfect trapezoidal shape, and the fixing support portion also includes the rupture blocking portion 86. The base member 81 and the fixing support portion 87 mostly duplicate each other, but the base member 81 is distinguished from the fixing support portion regarding the presence of sections including the rupture portions in the base member 81.

A door portion is corresponds to the inner region when the rupture portion 82 (linear fragile portions 83, 84, 85) has a perfect trapezoidal shape, and one side thereof (the side connecting the linear fragile portions 84, 85) is in contact with the fixing support portion 87.

With the gas discharge port 113 of the gas generator closed by the seal tape 50D, when the linear fragile portions 83, 84, 85 are ruptured by the pressure acting in the thickness direction, one side of the trapezoid (the side connecting the linear fragile portions 84, 85) remaining intact, a trapezoidal door is opened and the gas discharge port 113 is entirely opened.

The seal tape 50D shown in FIG. 7(b) is different from the seal tape 50D shown in FIG. 7(a) in the aspects as follows.

In the seal tape 50D shown in FIG. 7(a), the linear fragile portion 83 is oriented in the direction perpendicular to the width direction (direction parallel to the longitudinal direction), whereas in the seal tape 50D shown in FIG. 7(b), the linear fragile portion 83 is oriented in the direction parallel to the width direction (direction perpendicular to the longitudinal direction).

In the seal tape 50D shown in FIG. 7(b), rupture blocking portions 86a, 86b (thick portions similar to the rupture blocking portion 86) are formed both at the edge 81a and at the edge 81b.

The tip of the linear fragile portion 84 is in contact with the rupture blocking portion 86a, and the tip of the linear fragile portion 85 is in contact with the rupture blocking portion 86b.

The formation state of the linear fragile portions 83, 84, 85 in the seal tape 50D shown in FIG. 7(c) is similar to that shown in FIG. 7(b), but the rupture blocking portion 86c (thick portion similar to the rupture blocking portion 86) is in contact with the tips of the linear fragile portions 84, 85 and extends in the width direction of the seal tape 50D.

In the seal tapes 50D shown in (a), (b), and (c) in FIG. 7, the surface area of the fixing support portion is increased by comparison with that of the seal tapes 10A and 10B shown in FIGS. 1 and 2, thereby facilitating the demonstration of the second functions and effects.

<Gas Generator>

In the gas generator in accordance with the present invention, a plurality of gas discharge ports formed in the housing of the gas generator are closed, from the outside, by the above-described seal tape (first to fourth seal tapes shown in FIGS. 1 to 7).

In the gas generator in accordance with the present invention, the above-described seal tape (first to fourth seal tapes shown in FIGS. 1 to 7) can be applied to various conventional gas generators. The followings are some examples:

the above-described seal tape is attached, from the outside, to an outer wall surface including gas discharge ports 13 of the housing 10 of the gas generator for an airbag shown in FIG. 1 of JP-A No. 2005-178643;

the above-described seal tape is attached, from the outside, to an outer wall surface including gas discharge ports 21 of the housing 3 of the gas generator for an airbag shown in FIG. 1 of DE-A No. 19817485; and the above-described seal tape is attached, from the outside, to an outer wall surface including gas discharge ports 24 of the housing 12 of the gas generator for an airbag shown in FIG. 1 of U.S. Pat. No. 6,032,979).

A gas generator for an airbag apparatus (side airbag apparatus) which has a structure same as (whereas, the dimensions are not identical) that of the gas generator for an airbag shown in FIG. 1 of JP-A No. 2005-178643 and in which the gas discharge port is positioned in the center, in the longitudinal direction, of the housing will be explained below with reference to FIGS. 8 to 13.

Figure 8:
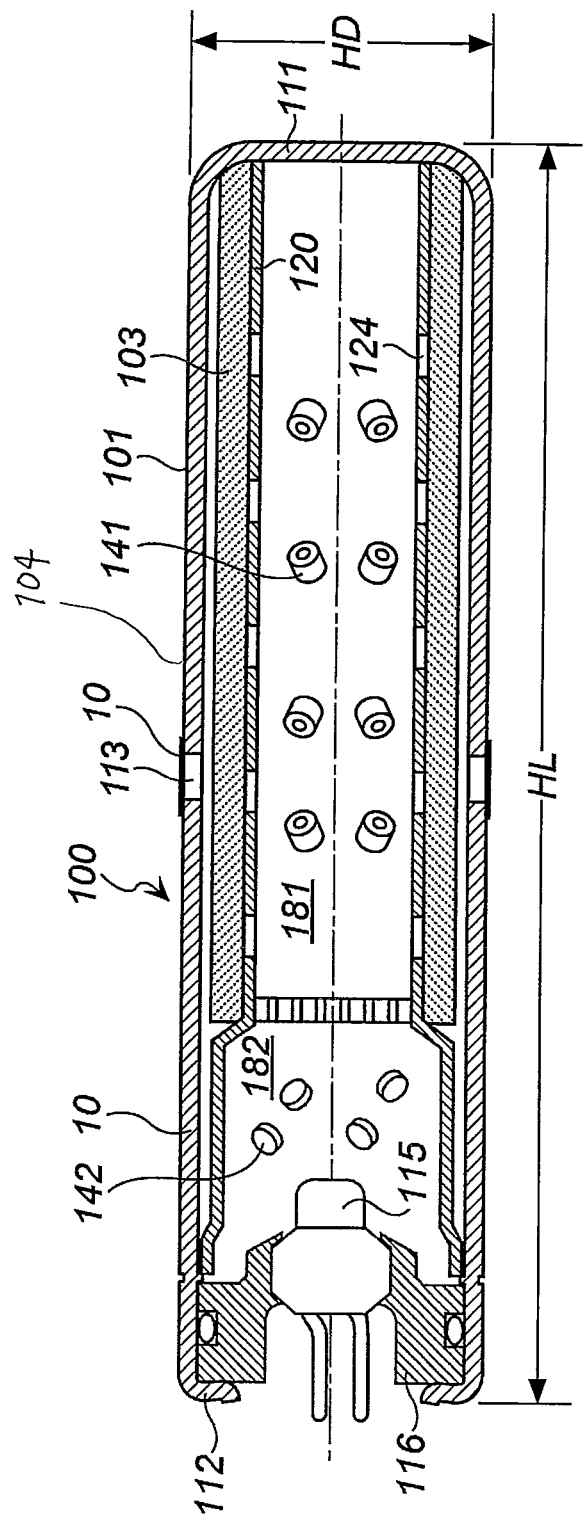
FIG. 8 shows an axial cross-sectional view of the gas generator in accordance with the present invention.

Embodiment Illustrated by FIG. 8

In a gas generator 100 shown in FIG. 8, an outer shell container includes a cylindrical housing 101 closed at one end (closed end) 111 and open at the other end 112.

In the cylindrical housing 101, the ratio (HL/HD) of the length (HL) to the outer diameter (HD) is 4.

An inner tubular member 120 having an opening 124 is disposed inside the cylindrical housing 101, and a filter 103 is provided outside the inner tubular member 120.

Combustion chambers 181, 182 charged with a first gas generating agent 141 and a second gas generating agent 142 are formed inside the inner tubular member 120.

A collar 116 with an igniter 115 mounted thereon is provided at the other end (open end) 112 of the housing 101.

A plurality of gas discharge ports 113 are formed with equal distance in the circumferential direction at center position (½HL position, at 0.5×HL from the open end 112), in the longitudinal direction of the cylindrical housing 101.

The plurality of gas discharge ports 113 is closed, from the outside, by the seal tape 10 (first to fourth seal tapes shown in FIGS. 1 to 7) attached to a circumferential wall portion 104 of the cylindrical housing 101.

When gas discharge ports 113 are formed in a plurality of locations separated in the longitudinal direction, a plurality of seal tapes 10 is used.

Figure 9:
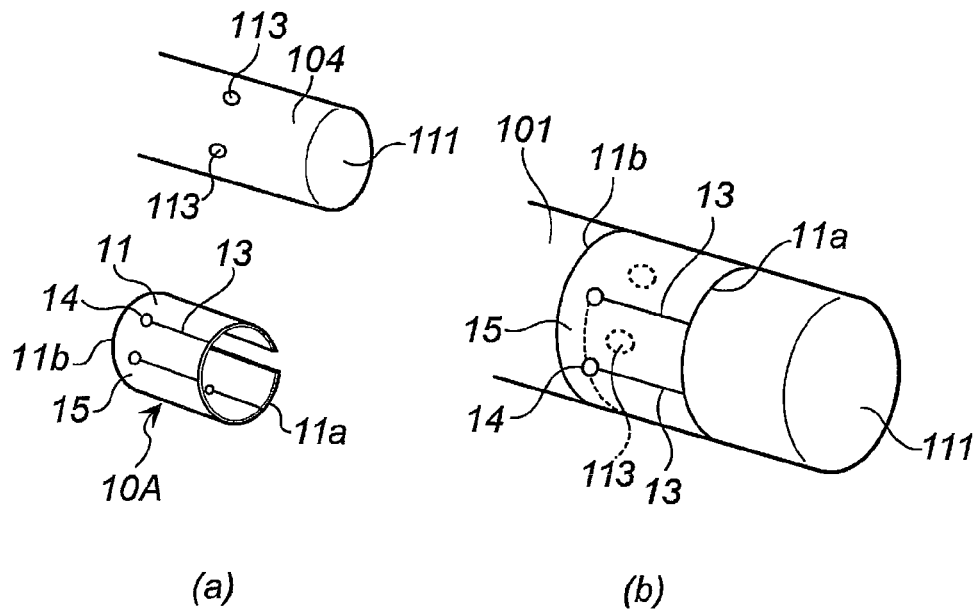
FIG. 9 shows, in (*a*), a perspective view illustrating the state before the seal tape is attached to the gas generator and, in (*b*), a perspective view illustrating the state after the seal tape is attached.
Figure 10:
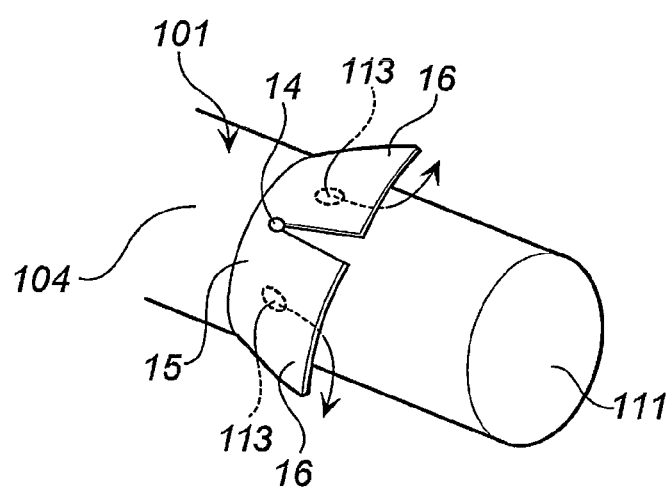
FIG. 10 is a perspective view illustrating changes occurring after actuation in (*b*) of FIG. 9.

Embodiment Illustrated by FIGS. 9 and 10

(a) and (b) in FIG. 9 are perspective views illustrating a method for attaching a seal tape in the case where the seal tape 10A shown in FIG. 1(a) is used as the seal tape 10 and the attachment state obtained thereby.

FIG. 9(a) shows the housing 101 provided with gas discharge ports 113 and the seal tape 10A prior to attachment.

FIG. 9(b) shows a state after the seal tape 10A has been attached, from the outside, to the circumferential wall portion 104 of the housing 101 including the gas discharge ports 113 and the gas discharge ports 113 have been closed. As shown in the drawings, the plurality of gas discharge ports 113 is positioned between two linear fragile portions 13.

Further, FIG. 8 illustrates the operation performed when the seal tape 10A shown in FIG. 1(a) is used as the seal tape 10 that closes the gas discharge ports 113.

When an igniter 115 is actuated, the first gas generating agent 142 and the second gas generating agent 141 are ignited and burned, thereby generating a gas. The gas flows out through an opening 124 of the inner tubular member 120, passes through the filter 103, and then breaks down the seal tape 10A and is discharged from the plurality of gas discharge ports 113.

When the seal tape 10A is broken in such gas discharge process as shown in FIG. 10, the seal tape 10A which has received the gas pressure in the thickness direction is ruptured in the linear fragile portions 13 and opens in the form of quadrangular doors 16 (for example, door portions 16 shown in FIG. 1(b)). As a result, the gas discharge ports 113 are opened.

Since the gas discharge ports 113 are thus instantaneously opened and the pressure is not applied over a long period, the seal tape 10A is prevented from breaking into small fragments.

Since the propagation of rupture at the linear fragile portions 13 is stopped by through holes serving as rupture blocking portions 14, the fixing support portion 15 remains attached to the circumferential wall surface 104 of the housing.

Since the attachment state of the fixing support portion 15 is thus maintained, rupture in the linear fragile portions 13 is enhanced, the seal tape 10A is prevented from dropping off, and the seal tape 10A is also prevented from being cut into pieces and generating small fragments.

Figure 11:
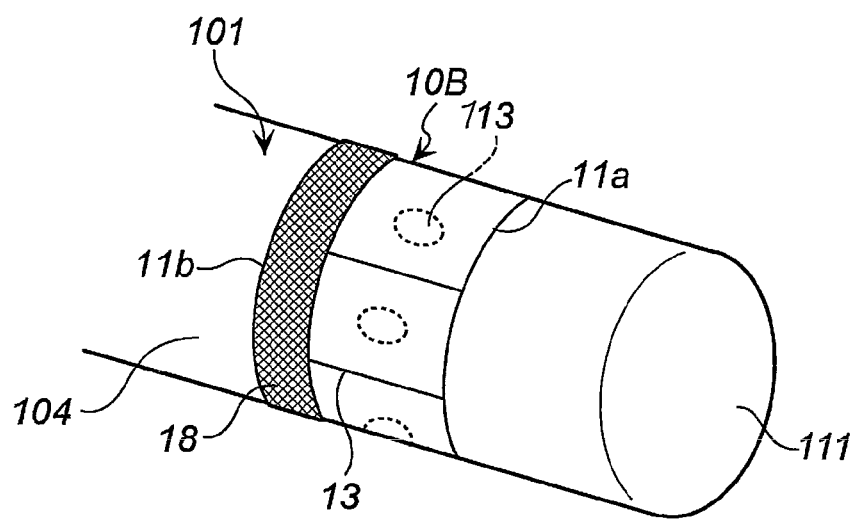
FIG. 11 is a perspective view taken when a seal tape other than that shown in (*b*) of FIG. 9 is attached.

Embodiment Illustrated by FIG. 11

The gas generator 100 shown in FIG. 8 can use the seal tape 10B shown in FIG. 2(a) instead of the seal tape 10.

FIG. 11 is a perspective view corresponding to FIG. 9(b) and showing a state in which the seal tape 10B shown in FIG. 2(a) is used and the gas discharge ports 113 of the housing 101 are closed from the outside.

When the seal tape 10B shown in FIG. 2(a) is used instead of the seal tape 10 in the gas generator 100 shown in FIG. 8, the seal tape 10B that has received a gas pressure in the thickness direction is ruptured at linear fragile portions 13 and opened in the form of square doors, thereby opening the gas discharge ports 113. The propagation of rupture in the linear fragile portions 13 is stopped by the thick portion which is a rupture blocking portion 18.

Figure 12:
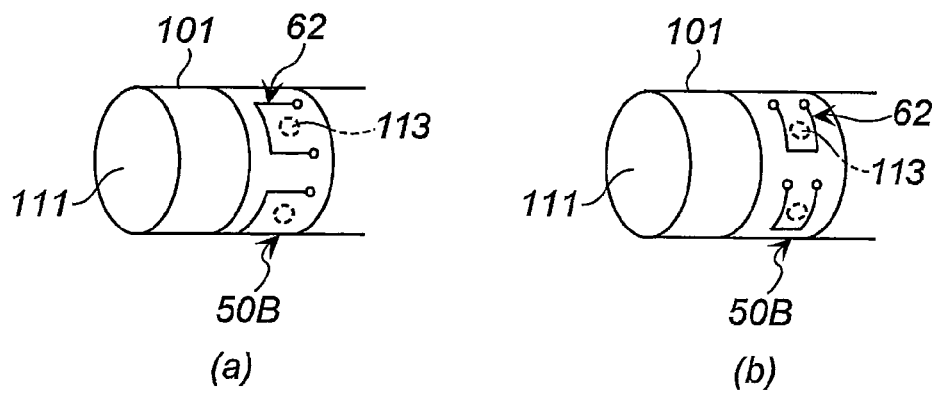
FIG. 12 shows perspective views taken when a seal tape other than that shown in (*b*) of FIG. 9 is attached.

Embodiment Illustrated by FIG. 12

The gas generator 100 shown in FIG. 8 can use the seal tape 50B shown in (a) and (b) in FIG. 5 instead of the seal tape 10.

FIG. 12(a) corresponds to FIG. 9(b) and shows a state in which the gas discharge ports 113 of the housing 101 are closed, from the outside, by the seal tape 50B shown in FIG. 5(a).

FIG. 12(b) corresponds to FIG. 9(b) and shows a state in which the gas discharge ports 113 of the housing 101 are closed, from the outside, by the seal tape 50B shown in FIG. 5(b).

When the seal tape 50B shown in FIG. 5(a) is used instead of the seal tape 10 in the gas generator 100 shown in FIG. 8, the rupture portions 63, 64, 65 are ruptured and opened in the form of square doors (door portion 69 shown in FIG. 5(c)), thereby opening the gas discharge ports 113. The rupture of the rupture portions 64, 65 is stopped by the rupture blocking portions 66, 67. The fixing support portion 68 remains attached to the housing 101.

Figure 13:
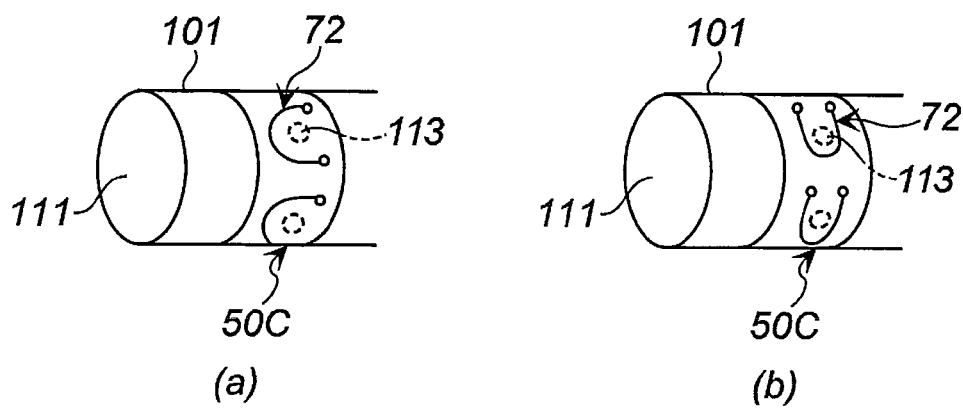
FIG. 13 shows perspective views taken when a seal tape other than that shown in (*b*) of FIG. 9 is attached.

Embodiment Illustrated by FIG. 13

The gas generator 100 shown in FIG. 8 can use the seal tape 50C shown in (a) and (b) in FIG. 6 instead of the seal tape 10.

FIG. 13(a) corresponds to FIG. 9(b) and shows a state in which the seal tape 50C shown in FIG. 6(a) is used and the gas discharge ports 113 of the housing 101 are closed, from the outside, by the seal tape 50C shown in FIG. 6(a).

FIG. 13(b) corresponds to FIG. 9(b) and shows a state in which the gas discharge ports 113 of the housing 101 are closed, from the outside, by the seal tape 50C shown in FIG. 6(b).

When the seal tape 50C shown in FIG. 6(a) is used instead of the seal tape 10 in the gas generator 100 shown in FIG. 8, the rupture portions 72 are ruptured and opened in the form of semi-elliptical doors, thereby opening the gas discharge ports 113. The rupture from two tips of the rupture portions 73 is stopped by the rupture blocking portions 74, 75. The fixing support portion 77 remains attached to the housing 101.

<Method for Manufacturing the Gas Generator>

A method for manufacturing the gas generator 100 shown in FIG. 8 will be explained below.

When the gas discharge ports 113 are closed by attaching the seal tape 10 from the inside of the housing 101, as in the conventional gas generator, the gas generator is manufactured by the process including the steps of:

closing the gas discharge port 113 by attaching the seal tape 10 from the inside of the housing 101 in the initial step, then inserting the filter 103 and the inner tubular member 124, loading the first gas generating agent 141 and the second gas generating agent 142, and inserting the igniter 115 fixed to the collar 116 and fixing the collar 116 by crimping the end 112.

However, in the manufacturing method according to the invention of the present application, the gas discharge ports 113 are closed by attaching the seal tape 10 from the outside.

When the seal tape 10 is attached as in the manufacturing method according to the present invention, no restriction is placed on the order of the attachment step, as in the conventional method in which the seal tape is attached from the inside of the housing. From the standpoint of ensuring moisture-proofing inside the housing, it is desirable that the seal tape be attached before the gas generating agents 141, 142 are accommodated inside the housing 101.

In the step of closing the gas discharge ports 113 by attaching the seal tape 10 from the outside, the seal tape is attached such as to adjust the positions of the seal tape and the gas discharge ports as shown in FIGS. 9 to 12 according to the form of the seal tape used.

Further, in the manufacturing method in accordance with the present invention, a step of covering the seal tape with a protective material can be additionally performed after the gas discharge ports have been closed with the seal tape from the outside.

With the manufacturing method in accordance with the present invention, the gas discharge ports 113 are closed by attaching the seal tape 10 from the outside of the housing 101. Therefore, the seal tape is easily attached even when the housing has an elongated shape as the housing 101 shown in FIG. 8 and the gas discharge ports 113 are positioned in the central zone, in the longitudinal direction, of the housing 101.

Further, when the filter 103 is inserted, the filter 103 does not come into contact with the seal tape 10.

Therefore, although the number of steps is the same as in the conventional method, the operation load is reduced, the attachment state of the seal tape 10 is easily ensured, and product quality is increased.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A seal tape for closing, from the outside, a plurality of gas discharge ports formed in a housing of a gas generator for a restraining apparatus, the seal tape comprising:

a plurality of rupture portions for forming a plurality of door portions that open the gas discharge ports by opening when a pressure is applied in a thickness direction of the seal tape;

a fixing support portion for forming, together with the plurality of rupture portions, the plurality of door portions, the fixing support portion remaining attached to the housing when a pressure is applied in the thickness direction;

the plurality of rupture portions being formed by a combination of a plurality of linear fragile portions extending linearly from one side to the other side in a width direction of the seal tape with a distance in a longitudinal direction of the seal tape, and rupture blocking portions for blocking propagation of rupture at a tip of each of the plurality of linear fragile portions;

the fixing support portion being a band-like portion that is continuous in the longitudinal direction and has a predetermined width from a side, in the width direction, where the rupture blocking portions are formed;

the plurality of door portions corresponding to a region bounded by the rupture portions and the fixing support portion; and an arrangement of the plurality of door portions being adjusted such that when the plurality of gas discharge ports are closed from the outside by the seal tape, the gas discharge ports are entirely open in a case where the door portions are opened.

2. The seal tape according to claim 1, wherein the linear fragile portions are equal in number to the plurality of gas discharge ports, and the linear fragile portions are formed equidistantly and form the door portions equal in number to the gas discharge ports.

3. The seal tape according to claim 1, wherein the width of the band-like portion serving as the fixing support portion is within a range of 15 to 40% of a width of the seal tape.

4. A seal tape for closing, from the outside, a plurality of gas discharge ports formed in a housing of a gas generator for a restraining apparatus,
the seal tape comprising:
a plurality of rupture portions for forming a plurality of door portions that open the gas discharge ports by opening when a pressure is applied in a thickness direction of the seal tape;
a fixing support portion for forming, together with the plurality of rupture portions, the plurality of door portions, the fixing support portion remaining attached to the housing when a pressure is applied in the thickness direction;
the plurality of rupture portions being formed by a combination of
linear fragile portions that are twice the number of the gas discharge ports and extended linearly from one side to the other side in a width direction of the seal tape, with a distance in a longitudinal direction, and
rupture blocking portions for blocking propagation of rupture at a tip of each of the plurality of linear fragile portions;
the fixing support portion including
a first fixing support portion that is a band-like portion formed continuously in the longitudinal direction at a side, in the width direction, where the rupture blocking portions are formed, and
a second fixing support portion corresponding to regions that are sandwiched in the longitudinal direction by two rupture portions and do not face the gas discharge ports when the plurality of gas discharge ports are closed from the outside;
the plurality of door portions corresponding to regions bounded by the rupture portions and the first fixing support portion and excluding the second fixing support portions; and
the plurality of door portions and the second fixing support portions being disposed alternately in the longitudinal direction and adjusted such that when the plurality of gas discharge ports are closed from the outside by the seal tape, the gas discharge ports are entirely open in a case where the door portions are opened.

5. A seal tape for closing, from the outside, a plurality of gas discharge ports formed in a housing of a gas generator for a restraining apparatus,
the seal tape comprising:
a plurality of rupture portions for forming door portions that open the gas discharge ports by opening when a pressure is applied in a thickness direction of the seal tape;
a fixing support portion for forming, together with the plurality of rupture portions, a plurality of door portions, the fixing support portion remaining attached to the housing when a pressure is applied in the thickness direction;
each rupture portion of the plurality of rupture portions including a combination of
a region that is to be a door portion in which linear fragile portions are combined so as to form n−1 sides of a polygon, wherein the total number of sides is n, and
rupture blocking portions for blocking propagation of rupture at two tips of the linear fragile portions;
each gas discharge port of the plurality of gas discharge ports being sized to be enclosed in a corresponding one of the rupture portion when said corresponding one of the rupture portions is a perfect polygon;
the fixing support portion being an outer region which does not include the rupture blocking portions when the rupture portions are perfect polygons;
each door portion corresponding to an inner region of one of the rupture portions when the rupture portions are perfect polygons; and
an arrangement of the plurality of door portions being adjusted such that when the plurality of gas discharge ports are closed from the outside by the seal tape, the gas discharge ports are entirely open in a case where the door portions are opened.

6. A seal tape for closing, from the outside, a plurality of gas discharge ports formed in a housing of a gas generator for a restraining apparatus,
the seal tape comprising:
a plurality of rupture portions for forming door portions that open the gas discharge ports by opening when a pressure is applied in a thickness direction of the seal tape; and
a fixing support portion for forming, together with the plurality of rupture portions, a plurality of door portions, the fixing support portion remaining attached to the housing when a pressure is applied in the thickness direction;
each of the plurality of rupture portions including a combination of
a region that is to be a door portion in which a fragile portion is combined so as to form a partial circle or a partial ellipse, and
rupture blocking portions for blocking propagation of rupture at two tips of the linear fragile portion;
each gas discharge port of the plurality of gas discharge ports being sized to be enclosed inside the partial circle or the partial ellipse;
the fixing support portion being an outer region which does not include the rupture blocking portions when each rupture portion is a partial circle of partial ellipse;
each door portion corresponding to an inner region of one of the rupture portions when the rupture portions are partial circles or partial ellipses; and
an arrangement of the plurality of door portions being adjusted such that when the plurality of gas discharge ports are closed from the outside by the seal tape, the gas discharge ports are entirely open in a case where the door portions are opened.

7. The seal tape according to claim 1, wherein the rupture blocking portion is a through hole of a round, elliptical, or round cornered polygonal shape provided in contact with a tip portion of the linear fragile portion forming the rupture portion.

8. The seal tape according to claim 1, wherein the rupture blocking portion is a portion thinner than a remaining portion of the seal tape and having a round, elliptical, or round cornered polygonal shape provided in contact with a tip portion of the linear fragile portion forming the rupture portion.

9. The seal tape according to claim 1, wherein the rupture blocking portion is a portion thicker than a remaining portion of the seal tape and provided in contact with a tip portion of the linear fragile portion forming the rupture portion.

10. A gas generator for a restraining apparatus that accommodates a gas generating agent in a housing having a plurality of gas discharge ports, comprising:
the gas discharge ports closed, from the outside, by the seal tape according to claim 1, so that door portions of the seal tape face the gas discharge ports.

11. The gas generator for a restraining apparatus according to claim 10, wherein the housing has a cylindrical shape and a ratio (HL/HD) of a length (HL) of the housing to an outer diameter (HD) of the housing is equal to or greater than 2.

12. The gas generator for a restraining apparatus according to claim 10, wherein
the housing has a cylindrical shape and a ratio (HL/HD) of a length (HL) of the housing to an outer diameter (HD) of the housing is equal to or greater than 2; and
the plurality of gas discharge ports are formed within a range of a length from one side of 30-70% (of a length (HL)) including a center position (½HL) of the length (HL) of the housing.

13. The gas generator for a restraining apparatus according to claim 10, wherein
the housing has a closed bottom obtained by closing, in advance, an opening at one end, and an opening at the other end of the housing is closed after constituent components including a gas generating agent have been accommodated therethrough;
a ratio (HL/HD) of a length (HL) of the housing to an outer diameter (HD) of the housing is equal to or greater than 2; and
the plurality of gas discharge ports are formed within a range equal to or greater than 0.2×HL from a closed portion of the other end of the housing.

14. A method for manufacturing a gas generator for a restraining apparatus in which a gas generating agent is accommodated in a housing having a plurality of gas discharge ports, including
a step of closing the plurality of gas discharge ports from the outside with the seal tape according to claim 1, so that door portions of the seal tape face the gas discharge ports.

15. The method for manufacturing a gas generator for a restraining apparatus according to claim 14, wherein the housing has a cylindrical shape and a ratio (HL/HD) of a length (HL) of the housing to an outer diameter (HD) of the housing is equal to or greater than 2.

16. The method for manufacturing a gas generator for a restraining apparatus according to claim 14, wherein
the housing has a cylindrical shape and a ratio (HL/HD) of a length (HL) of the housing to an outer diameter (HD) of the housing is equal to or greater than 2; and
the plurality of gas discharge ports are formed within a range of a length from one side of 30-70% of the length (HL) including a center position (½HL) of the length (HL) of the housing.

17. The method for manufacturing a gas generator for a restraining apparatus according to claim 14, wherein
the housing has a closed bottom obtained by closing, in advance, an opening at one end, and an opening at the other end of the housing is closed after constituent components including a gas generating agent have been accommodated therethrough;
a ratio (HL/HD) of a length (HL) of the housing to an outer diameter (HD) of the housing is equal to or greater than 2; and
the plurality of gas discharge ports are formed within a range equal to or greater than 0.2×HL from a closed portion of the other end of the housing.

18. The method for manufacturing a gas generator for a restraining apparatus according to claim 14, comprising a step of covering the seal tape with a protective material after the plurality of gas discharge ports are closed from the outside the seal tape comprising:
a plurality of rupture portions for forming a plurality of door portions that open the gas discharge ports by opening when a pressure is applied in a thickness direction of the seal tape;
a fixing support portion for forming, together with the plurality of rupture portions, the plurality of door portions, the fixing support portion remaining attached to the housing when a pressure is applied in the thickness direction;
the plurality of rupture portions being formed by a combination of
a plurality of linear fragile portions extending linearly from one side to the other side in a width direction of the seal tape with a distance in a longitudinal direction of the seal tape, and
rupture blocking portions for blocking propagation of rupture at a tip of each of the plurality of linear fragile portions;
the fixing support portion being a band-like portion that is continuous in the longitudinal direction and has a predetermined width from a side, in the width direction, where the rupture blocking portions are formed;
the plurality of door portions corresponding to a region bounded by the rupture portions and the fixing support portion; and
an arrangement of the plurality of door portions being adjusted such that when the plurality of gas discharge ports are closed from the outside by the seal tape, the gas discharge ports are entirely open in a case where the door portions are opened.

* * * * *